United States Patent [19]
Sasaki

[11] Patent Number: 5,481,652
[45] Date of Patent: Jan. 2, 1996

[54] CONTROL SYSTEM FOR ROBOT

[75] Inventor: Motonobu Sasaki, Nagoya, Japan

[73] Assignee: Mitsubishi Denki Kabushiki Kaisha, Tokyo, Japan

[21] Appl. No.: 4,062

[22] Filed: Jan. 13, 1993

[30] Foreign Application Priority Data

Jan. 14, 1992 [JP] Japan ..................... 4-004773

[51] Int. Cl.⁶ .............................. B25J 15/00; B25J 9/16; B25J 13/02; G05B 19/18
[52] U.S. Cl. ................................. 395/97; 395/86
[58] Field of Search ............................... 395/86, 92, 97, 395/99, 80; 318/568.11, 568.17

[56] References Cited

U.S. PATENT DOCUMENTS

| | | | |
|---|---|---|---|
| 4,305,130 | 12/1981 | Kelley et al. | 395/94 |
| 4,402,052 | 8/1983 | Kelley et al. | 395/94 |
| 4,433,382 | 2/1984 | Cunningham et al. | 395/92 |
| 4,529,921 | 7/1985 | Moribe | 318/568 |
| 4,763,276 | 8/1988 | Perreirra | 395/97 |
| 4,887,222 | 12/1989 | Miyake et al. | 395/86 |
| 5,129,044 | 7/1992 | Kashiwagi et al. | 395/86 |
| 5,308,221 | 5/1994 | Shinokoshi et al. | 414/734 |

FOREIGN PATENT DOCUMENTS

| | | |
|---|---|---|
| 0402788 | 12/1990 | European Pat. Off. . |
| 0442481 | 8/1991 | European Pat. Off. . |
| 62-199383 | 9/1987 | Japan . |
| 299406 | 8/1990 | Japan . |
| 2146796 | 4/1986 | United Kingdom . |
| 2232504 | 12/1990 | United Kingdom . |

OTHER PUBLICATIONS

Liu et al., "The Multi–Dimensional Quality Tark Requirements for Dextrous Robot Hand Control", Proc 1989 IEEE Int'l Conf on Robotics+Automation, May 14–19, 1989, pp. 452–457 vol. 1.

*Primary Examiner*—Robert W. Downs
*Attorney, Agent, or Firm*—Sughrue, Mion, Zinn, Macpeak & Seas; Richard C. Turner; Steven M. Cruskin

[57] ABSTRACT

A control system for a robot including a teaching box provided with a hand alignment command section and a control unit for the robot. A hand-alignment movement-amount computing section computes an amount of movement along each axis of the robot in a hand alignment operation. A drive section drives the robot. A present-position data memory section stores data for a present position of a hand. A present-pose data memory section stores data for the present pose of the hand of the robot. A pose memory section stores deserved pose data of the hand which data is, required for a teaching operation. A pose-data modifying section modifies the data of the pose memory section. A pose memory command section instructs the modifying to modify the pose data.

10 Claims, 36 Drawing Sheets

FIG. 2

PRESENT-POSITION
DATA MEMORY SECTION

```
X =    1 0 0 . 0 0
Y = − 2 0 0 . 0 0
Z =    3 0 0 . 0 0
```
~ 2−1

OUTPUT: HAND-ALIGNMENT
       MOVEMENT-AMOUNT
       COMPUTING SECTION

INPUT: DRIVE SECTION

```
X =    1 0 0 . 0 0
Y = − 2 0 0 . 0 0
Z =    3 0 0 . 0 0
A =        0 . 1 1
B =        0 . 2 2
C =        0 . 3 3
```
~ 2−2

POSE MEMORY SECTION

```
A =    0 . 1 1
B =    0 . 2 2
C =    0 . 3 3
```
~ 2−3

OUTPUT: HAND-ALIGNMENT
       COMMAND SECTION

INPUT: HAND-ALIGNMENT
       MOVEMENT-AMOUNT
       COMPUTING SECTION

PRESENT-POSITION
DATA MEMORY SECTION

```
X =    100.00
Y =  - 200.00
Z =    300.00
```
~ 5-1

OUTPUT: HAND-ALIGNMENT
       MOVEMENT-AMOUNT
       COMPUTING SECTION

INPUT: DRIVE SECTION

```
X =    100.00
Y =  - 200.00
Z =    300.00
A =      0.11
B =      0.22
C =      0.33
```
~ 5-2

POSE MEMORY SECTION

```
A =      0.11
B =      0.22
C =      0.33
```
~ 5-3

PRESENT-POSE DATA
MEMORY SECTION

```
A =      4.44
B =    - 5.55
C =      6.66
```
~ 5-4

OUTPUT: HAND-ALIGNMENT
       COMMAND SECTION

INPUT: HAND-ALIGNMENT
       MOVEMENT-AMOUNT
       COMPUTING SECTION

`ALIGN` ~ 5-5

OUTPUT: POSE MEMORY
       COMMAND SECTION

INPUT: POSE-DATA
       MODIFYING SECTION

`SISEI` ~ 5-6

FIG. 9

PRESENT-POSITION
DATA MEMORY SECTION

```
X =   100.00
Y = - 200.00
Z =   300.00
```
9 - 1

OUTPUT: HAND-ALIGNMENT
        MOVEMENT-AMOUNT
        COMPUTING SECTION

INPUT: DRIVE SECTION

```
X =   100.00
Y = - 200.00
Z =   300.00
A =     0.11
B =     0.22
C =     0.33
```
9 - 2

POSE MEMORY SECTION

```
A =     0.11
B =     0.22
C =     0.33
```
9 - 3

PRESENT-POSE DATA
MEMORY SECTION

```
A =     4.44
B = -   5.55
C =     6.66
```
9 - 4

OUTPUT: HAND-ALIGNMENT
        COMMAND SECTION

INPUT: HAND-ALIGNMENT
       MOVEMENT-AMOUNT
       COMPUTING SECTION

```
ALIGN  2
```
9 - 5

OUTPUT: POSE MEMORY
        COMMAND SECTION

INPUT: POSE-DATA
       MODIFYING SECTION

```
SISEI  2
```
9 - 6

FIG. 13

PRESENT-POSITION
DATA MEMORY SECTION

```
X =    100.00
Y = - 200.00
Z =    300.00
```
~ 13-1

OUTPUT: HAND-ALIGNMENT
        MOVEMENT-AMOUNT
        COMPUTING SECTION

INPUT:  DRIVE SECTION

```
X =    100.00
Y = - 200.00
Z =    300.00
A =      0.11
B =      0.22
C =      0.33
```
~ 13-2

POSE MEMORY SECTION

```
A =      0.11
B =      0.22
C =      0.33
```
~ 13-3

PRESENT-POSE DATA
MEMORY SECTION

```
A =      4.44
B =    - 5.55
C =      6.66
```
~ 13-4

OUTPUT: HAND-ALIGNMENT
        COMMAND SECTION

INPUT:  HAND-ALIGNMENT
        MOVEMENT-AMOUNT
        COMPUTING SECTION

`ALIGN`  ~ 13-5

OUTPUT: POSE MEMORY
        COMMAND SECTION

INPUT:  POSE-DATA
        MODIFYING SECTION

`SISEI`  ~ 13-6

POSE-NUMBER MEMORY SECTION   `NO  2`  ~ 13-7

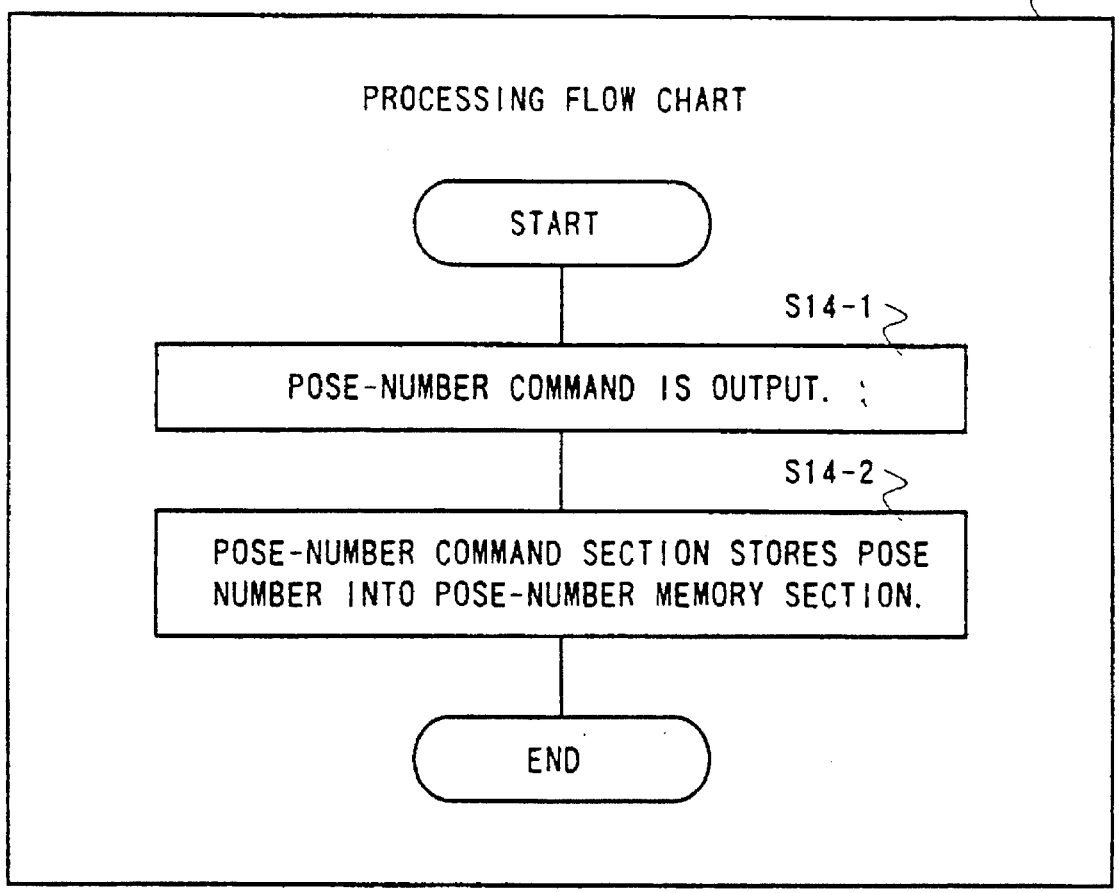

FIG. 28

28-1 PRESENT-POSITION DATA MEMORY SECTION
```
X =   100.00
Y = - 200.00
Z =   300.00
```

28-2 OUTPUT: HAND-ALIGNMENT MOVEMENT-AMOUNT COMPUTING SECTION
INPUT: DRIVE SECTION
```
X =   100.00
Y = - 200.00
Z =   300.00
A = -  26.10
B =    23.33
C =    15.62
```

28-3 POSE MEMORY SECTION
```
A =     0.11
B =     0.22
C =     0.33
```

28-4 PRESENT-POSE DATA MEMORY SECTION
```
A =     4.44
B = -   5.55
C =     6.66
```

28-5 OUTPUT: HAND-ALIGNMENT COMMAND SECTION
INPUT: HAND-ALIGNMENT MOVEMENT-AMOUNT COMPUTING SECTION
```
ALIGN   2
```

28-9 OPERATION COORDINATE-SYSTEM MEMORY SECTION
```
X =    11.11
Y = -  22.22
Z =    33.33
A =    44.44
B = -  55.55
C =    66.66
```

28-10 OUTPUT: HAND-ALIGNMENT MOVEMENT-AMOUNT COMPUTING SECTION
INPUT: COORDINATE TRANSFORMATION: BASE TO OPERATION COORDINATE SYSTEM
```
X =   100.00
Y = - 200.00
Z =   300.00
A =    44.44
B = -  55.55
C =    66.66
```

28-11 OUTPUT: COORDINATE TRANSFORMATION: BASE TO OPERATION COORDINATE SYSTEM
INPUT: HAND-ALIGNMENT MOVEMENT-AMOUNT COMPUTING SECTION
```
X =   147.49
Y =    70.97
Z =   289.54
A = -  61.18
B = -  20.46
C = -  67.32
```

28-12 OUTPUT: HAND-ALIGNMENT MOVEMENT-AMOUNT COMPUTING SECTION
INPUT: COORDINATE TRANSFORMATION: OPERATION TO BASE COORDINATE SYSTEM
```
X =   147.49
Y =    70.97
Z =   289.54
A = -  90.00
B =     0.00
C = -  90.00
```

28-13 OUTPUT: COORDINATE TRANSFORMATION: BASE TO OPERATION COORDINATE SYSTEM
INPUT: BASE-ALIGNMENT MOVEMENT-AMOUNT COMPUTING SECTION
```
X =   100.00
Y = - 200.00
Z =   300.00
A = -  26.10
B =    23.33
C =    15.62
```

FIG. 35
PRIOR ART

PRESENT-POSITION
DATA MEMORY SECTION

```
X =    100.00
Y =  - 200.00
Z =    300.00
```
~ 35-1

OUTPUT: HAND-ALIGNMENT
    MOVEMENT-AMOUNT
    COMPUTING SECTION

INPUT: DRIVE SECTION

```
X =    100.00
Y =  - 200.00
Z =    300.00
A =      0.00
B =  -  90.00
C =      0.00
```
~ 35-2

PRESENT-POSE DATA
MEMORY SECTION

```
A =      4.44
B =  -  95.55
C =      6.66
```
~ 35-3

OUTPUT: HAND-ALIGNMENT
    COMMAND SECTION

INPUT: HAND-ALIGNMENT
    MOVEMENT-AMOUNT
    COMPUTING SECTION

```
ALIGN
```
~ 35-4

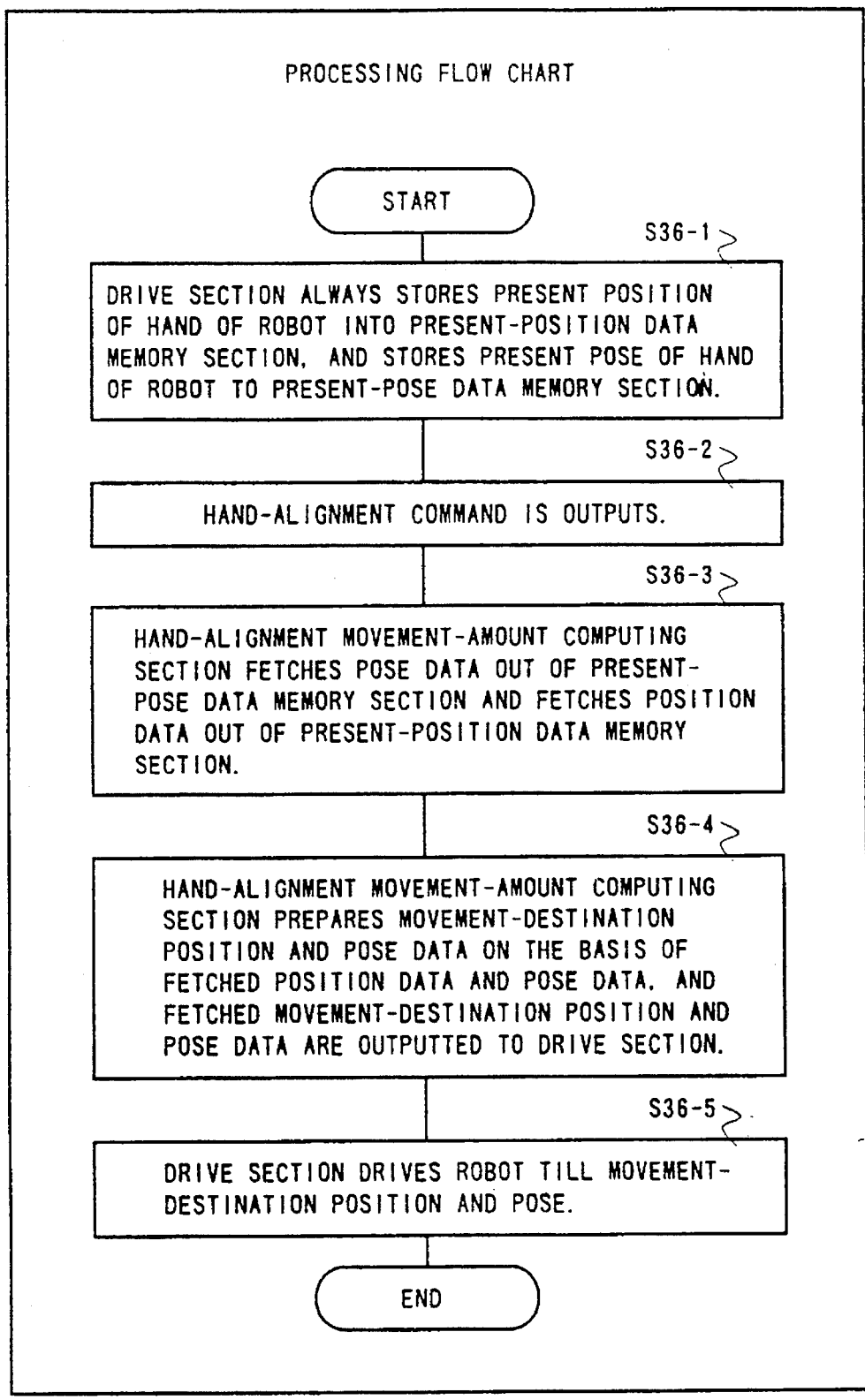

CONTROL SYSTEM FOR ROBOT

FIELD OF THE INVENTION

The present invention relates to a control system for a robot and, more particularly, to a system for teaching position and pose to a hand of the robot.

BACKGROUND OF THE INVENTION

In a "jog operation", an operator operates a movement instructing device to manually move a robot actually to certain position and pose. The jog operation is used when the operator manually moves the robot optionally in an optional coordinate system such as a joint coordinate system or an orthogonal coordinate system. Further, a coordinate system set at an acting point of an actuator which is mounted on a mechanical interface is called "a tool coordinate system". The jog operation in the tool coordinate system is called "a tool jog". Moreover, in a "hand alignment operation", instructions are practiced from a movement instructing device by the operator, to move a pose of a hand of a robot so as to automatically be brought to a predetermined pose, without a change of a present position of the hand of the robot. The hand alignment operation is chiefly used together with the tool jog and is utilized when the operator moves the tool to a position close to an operation objective article to teach position and pose to the hand.

Here, a coordinate system set on a base mounting surface of the robot is called "a base coordinate system". A position of the hand of the robot is expressed by a position of an origin of the tool coordinate system on the base coordinate system, and is mentioned as (X, Y, Z). Further, a pose of the hand of the robot is expressed by rotation of the tool coordinate system on the base coordinate system. Generally, the pose of the hand of the robot is expressed by (A, B, C), using an Euler's angle inscription. Accordingly, the position and pose of the hand of the robot are expressed by (X, Y, Z, A, B, C).

FIG. 34 of the attached drawings is a block diagram showing hand alignment operation of a conventional control system for a robot. In FIG. 34, a teaching box 1 is provided with a hand alignment command section 2. The reference numeral 3 denotes a control unit for the robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of the hand of the robot, which results from driving of the robot. A present-pose data memory section 7 stores therein a present pose of the hand of the robot, which results from driving of the robot. FIGS. 35 and 36 describe FIG. 34 from the viewpoint of software. FIG. 35 illustrates a data structure, while FIG. 36 illustrates a flow (F36) of a program.

Operation of the conventional control system for the robot will next be described. In FIG. 34, the drive section 5 always stores a current or present position (35-1) of the hand of the robot into the present-position data memory section 6, and stores the present pose (35-3) of the hand of the robot into the present-pose data memory section 7, as shown in step S36-1. First, in step S36-2, an operator instructs the hand alignment operation by means of the teaching box 1. The hand alignment command section 2 outputs a hand alignment command (35-4) to the hand-alignment movement-amount computing section 4. In step S36-3, the hand-alignment movement-amount computing section 4 fetches pose data (35-3) out of the present-pose data memory section 7, and fetches position data (35-1) out of the present-position data memory section 6. In step S36-4, the hand-alignment movement-amount computing section 4 draws up or prepares movement-destination position and pose data (35-2) on the basis of the fetched position data and pose data, such that the pose of the hand is brought to parallel with or perpendicularity to each axis of X, Y and Z in the base coordinate system. The prepared movement-destination position and pose data (35-2) are outputted to the drive section 5.

That is, assuming that the present position is (Xc, Yc, Zc), the present pose is (Ac, Bc, Cc), and the movement-destination position and pose due to the computing results are (X, Y, Z, A, B, C), the following relations are produced: In this connection, ¥ is an operator expressing an integer division.

$X=Xc$ $Y=Yc$ $Z=Zc$

In case of $Ac \geq 0$: $A=90° \times ((Ac+45°) ¥ 90°)$

In case of $Ac<0$: $A=90° \times ((Ac-45°) ¥ 90°)$

In case of $Bc \geq 0$: $B=90° \times ((Bc+45°) ¥ 90°)$

In case of $Bc<0$: $B=90° \times ((Bc-45°) ¥ 90°)$

In case of $Cc \geq 0$: $C=90° \times ((Cc+45°) ¥ 90°)$

In case of $Cc<0$: $C=90° \times ((Cc-45°) ¥ 90°)$

Lastly, in step s36-5, the drive section 5 drives the robot 8 to the movement-destination position and pose.

The conventional control system for the robot is arranged as described above. Accordingly, in the case where it is desired to teach a plurality of positions and poses at the same pose, if the pose of the hand is not in parallel with or perpendicular to each axis of X, Y and Z in the base coordinate system, it is required that an operator regulates or adjusts the pose of the hand by the jog operation after the hand alignment operation.

Further, it is difficult to accurately set an operation surface of the robot so as to be brought in parallel with or perpendicular to each axis of X, Y and Z in the base coordinate system. Only execution of the hand alignment operation by the operator makes it possible to bring the hand to the pose of the hand required for teaching.

SUMMARY OF THE INVENTION

It is therefore an object of the invention to provide a control system for a robot, which is capable of bringing a hand of the robot to a destination pose of hand alignment operation even if the hand is not a pose which is in parallel with or perpendicular to each axis of X, Y and Z in a base coordinate system.

It is also an object of the second invention to provide a control system for a robot, which is capable of optionally modifying the destination pose of the hand alignment operation.

It is a further object of the invention to provide a control system for a robot, which has a plurality of destination poses of the hand alignment operation, making it possible to optionally select the destination pose of the hand alignment.

It is also an object of the invention to provide a control system for a robot, which is capable of practicing such a hand alignment operation that the pose of the hand of the robot is brought in parallel with or perpendicular to each axis of X, Y and Z in the working coordinate system.

It is yet another an object of the invention to provide a control system for a robot, which has a plurality of working coordinate systems, making it possible to optionally select the working coordinate system which is the subject of hand alignment.

It is an object of the invention to provide a control system for a robot, which is capable of selecting a hand alignment operation in which an optionally set pose is brought to a movement destination pose, and hand alignment operation in which the pose of the hand of the robot is brought in parallel with or perpendicular to each of the axis (X, Y and Z) in the working coordinate system.

According to a first embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a pose memory means for storing therein data brought to a movement destination pose in case where hand alignment is instructed; and a hand-alignment movement-amount computing means for computing movement destination position and pose in which an optional stored pose is brought to a destination pose in case where the hand alignment is instructed, to output the computed movement-destination position and pose to the drive means.

In the first embodiment, the pose data of the hand required for the teaching operation are stored in the pose memory means. Further, the hand-alignment movement-amount computing means prepares the movement-destination position and pose data with the data in the present-position data memory means as the movement destination position and with the data of the pose memory means as the movement destination pose, in the case where the hand alignment is instructed. The movement-destination position and pose data are outputted to the drive means.

That is, assuming that a present position is (Xc, Yc, Zc), a stored pose is (Am, Bm, Cm), and movement-destination position and pose due to the computing results are (X, Y, Z, A, B, C), the following relations are produced:

X=Xc
Y=Yc
Z=Zc
A=Am
B=Bm
C=Cm

Accordingly, even if the pose is not a pose which is in parallel with or perpendicular to each axis of X, Y and Z in the base coordinate system, it is possible to bring the pose to the destination pose of the hand alignment operation.

As described above, in the first embodiment, the control system for the robot makes it possible that even the pose, which is not in parallel with or perpendicular to each axis of X, Y and Z in the base coordinate system, is brought to the destination pose of the hand alignment operation. Thus, the hand alignment function can effectively be utilized during the teaching operation.

According to the second embodiment, there is provided a control system for a robot, further comprising a present-pose data memory means for storing therein a present pose of the hand of the robot, a pose data modifying means for modifying data of the pose memory means to data of the present-pose data memory means, and a pose memory command means for instructing modification of the data to the pose data modifying means.

In the second embodiment, the pose data of the hand required for the teaching operation are stored in the pose memory means. Furthermore, the pose data modifying means modifies the data of the pose memory means to the data of the present-pose data memory means by instructions of the pose memory command means. Moreover, the hand-alignment movement-amount computing means prepares the movement-destination position and pose data with the data of the present-position data memory means as the movement destination position and with the data of the pose memory means as the movement destination pose, in the case where the hand alignment is instructed. The movement-destination position and pose data are outputted to the drive means.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Accordingly, even if the pose is not a pose which is in parallel with or perpendicular to each axis of X, Y and Z in the base coordinate system, it is possible to bring the pose to the destination pose of the hand alignment operation. Further, the operator stores the optional pose during the teaching operation, and it is possible to reproduce or revive the pose which is stored at the optional position.

The second embodiment makes it possible that the destination pose of a hand alignment operation is modified optionally. Thus, in addition to the advantages of the first embodiment, there are produced such advantages that it is possible that the operator stores the optional pose during the teaching operation, and the pose stored at the optional position can be reproduced or revived. This makes it possible to make the teaching operation easy.

According to the third embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a pose memory means for storing therein data brought to a movement destination pose in case where hand alignment is instructed;

a pose data modifying means for modifying the data of the designated pose memory means to data of the present-pose data memory means;

a pose memory command means for instructing modification of the data to the pose data modifying means;

a hand-alignment movement-amount computing means for computing movement-destination position and pose with an optional stored pose brought to a destination pose in case where the hand alignment is instructed, to output the computed movement-destination position and pose to the drive means; and a hand alignment command means for instructing the hand alignment to the hand-alignment movement-amount computing means.

In the third embodiment, the pose data of the hand required respectively for the teaching operations are stored in the plurality of pose memory means. Further, there are provided the plurality of pose memory command means and the plurality of hand alignment command means for the respective pose memory means. Furthermore, the pose data modifying means modifies the data of the corresponding pose memory means to the data of the present-pose data memory means by instructions of the optional pose memory command means. Moreover, the hand-alignment movement-amount computing means prepares the movement-destination position and pose data by the instructions from the optional hand alignment command means with the data of the present-position data memory means as the movement destination position and with the data of the corresponding pose memory means as the movement destination pose. The movement-destination position and pose data are outputted to the drive means.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Accordingly, even if the pose is not a pose which is in parallel with or perpendicular to each axis of X, Y and Z in the base coordinate system, it is possible to bring the pose to the destination pose of the hand alignment operation. Further, the operator stores the optional pose during the teaching operation, and it is possible to reproduce or revive the pose which is stored at the optional position. Furthermore, it is made possible that the operator stores a plurality of optional poses during the teaching operation, and optionally selects and reproduces the pose stored at the optional position.

According to the fourth embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a pose memory means for storing therein data brought to a movement destination pose in case where hand alignment is instructed;

a pose number memory means for storing therein data indicating the pose memory means which corresponds to a pose memory command and a hand alignment command;

a pose number command means for instructing a pose number to the pose number memory means;

a pose data modifying means for modifying the data of the designated pose memory means to data of the present-pose data memory means;

a pose memory command means for instructing modification of the data to the pose data modifying means;

a hand-alignment movement-amount computing means for computing movement-destination position and pose with an optional stored pose brought to a destination pose in case where the hand alignment is instructed, to output the computed movement-destination position and pose to the drive means; and a hand alignment command means for instructing the hand alignment to the hand-alignment movement-amount computing means.

In the fourth embodiment, the pose data of the hand required for the respective teaching operations are stored in the plurality of pose memory means. Further, the pose number command means stores the pose number into the pose-number memory means. Furthermore, the pose data modifying means fetches the pose number out of the pose-number memory means, and modified the data of the corresponding pose memory means to the data of the present-pose memory means, by the instructions of the pose memory means. Moreover, the hand-alignment movement-amount computing means fetches the pose number out of the pose number memory means, and prepares the movement-destination position and pose data with the data of the corresponding pose memory means as the movement destination pose and with the data of the present-position data memory means as the movement destination position. The movement-destination position and pose data are outputted to the drive means.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Accordingly, even if the pose is not a pose which is in parallel with or perpendicular to each axis of X, Y and Z in the base coordinate system, it is possible to bring the pose to the destination pose of the hand alignment operation. Further, the operator stores the optional pose during the teaching operation, and it is possible to reproduce or revive the pose which is stored at the optional position. Furthermore, the operator stores the plurality of optional poses during the teaching operation, and it is possible to optionally selects and reproduce or revive the pose which is stored at the optional position.

Each of the third and fourth embodiments has a plurality of destination poses of a hand alignment operation. The destination pose of the hand alignment can optionally be selected. In addition to the advantages of the second embodiment, there is produced such an advantage that the operator stores a plurality of optional poses during the teaching operation, and the poses stored at the optional position can optionally be selected and reproduced. This makes it possible to make the teaching operation further easy.

According to the fifth embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a working coordinate system memory means;

a coordinate transformation means from a base coordinate system to a working coordinate system;

a coordinate transformation means from the working coordinate system to the base coordinate system; and a hand-alignment movement-amount computing means for computing movement-destination position and pose such that a pose of the hand is aligned on the working coordinate system in case where the hand alignment is instructed, to output the computed movement-destination position and pose to the drive means.

In the fifth embodiment, the data indicating the working coordinate system on the base coordinate system are stored in the working coordinate system memory means. Further, the hand-alignment movement-amount computing means executes computation such that the pose of the hand is brought to parallel with or perpendicularity to each axis of X, Y and Z in the working coordinate system, and prepares the movement-destination position and pose data. The movement-destination position and pose data are outputted to the drive means.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

The present position and pose Msc expressed by the working coordinate system are obtained on the basis of the following equation, by the coordinate transformation means from the base coordinate system to the working coordinate system:

$$Msc=(Ms)^{-1} * Mbc$$

Subsequently, the movement-destination position and pose expressed by the working coordinate system are computed from the present position and pose expressed by the working coordinate system, on the basis of the following equations:

$$Xsd=Xsc$$

$$Ysd=Ysc$$

$$Zsd=Zsc$$

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation means from the working coordinate system to the base coordinate system, on the basis of the following equation:

$$Mbd=Ms * Msd$$

Accordingly, the hand alignment operation is made possible in which the pose of the hand of the robot is in parallel with or perpendicular to each axis of X, Y and Z in the working coordinate system.

In the fifth embodiment, the hand alignment operation is made possible in which the pose of the hand is in parallel with or perpendicular to each axis of X, Y and Z in the working coordinate system. Thus, the hand alignment function can effectively be utilized during the teaching operation in the working coordinate system.

According to the sixth embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a working coordinate system memory means;

a coordinate transformation means from a base coordinate system to a working coordinate system;

a coordinate transformation means from the working coordinate system to the base coordinate system;

a hand-alignment movement-amount computing means for computing movement-destination position and pose such that a pose of the hand is aligned on the designated working coordinate system in case where the hand alignment is instructed, to output the computed movement-destination position and pose to the drive means; and a hand alignment command means for instructing the hand alignment to the hand-alignment movement-amount computing means.

In the sixth embodiment, the data indicating the working coordinate system on the base coordinate system, required respectively for the teaching operations are stored in the plurality of working coordinate system memory means. Further, there are the plurality of hand alignment command means correspondingly to the respective working coordinate system memory means. Furthermore, the hand-alignment movement-amount computing means executes computation such that the pose of the hand is brought to parallel with or perpendicularity to each axis of X, Y and Z in the designated working coordinate system, and prepares the movement-destination position and pose data. The movement-destination position and pose data are outputted to the drive means.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

The present position and pose Msc expressed by the working coordinate system are first obtained on the basis of the following equation, by the coordinate transformation means from the base coordinate system to the working coordinate system:

Msc=(Ms)$^{-1}$ * Mbc

Subsequently, the movement-destination position and pose expressed by the working coordinate system are computed from the present position and pose expressed by the working coordinate system, on the basis of the following equations:

Xsd=Xsc

Ysd=Ysc

Zsd=Zsc

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation means from the working coordinate system to the base coordinate system, on the basis of the following equation:

Mbd=Ms * Msd

Accordingly, the hand alignment operation is made possible in which the pose of the hand of the robot is brought to parallel with or perpendicularity to each axis of X, Y and Z in the working coordinate system. Moreover, there is produced such an advantage that the operator optionally selects a plurality of stored working coordinate systems during the teaching operation, and the hand alignment operation is made possible on the selected working coordinate system.

According to the seventh embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a working coordinate system memory means;

a working coordinate system number memory means for storing therein data indicating a working coordinate system which is brought to the subject of the hand alignment;

a working coordinate system number command means for instructing a working coordinate system number to the working coordinate system number memory means;

a coordinate transformation means from a base coordinate system to a working coordinate system;

a coordinate transformation means from the working coordinate system to the base coordinate system;

a hand-alignment movement-amount computing means for computing movement-destination position and pose such that pose of the hand is aligned on the designated working coordinate system in case where the hand alignment is instructed, to output the computed movement-destination position and pose to the drive means; and a hand alignment command means for instructing the hand alignment to the hand-alignment movement-amount computing means.

In the seventh embodiment, the data indicating the working coordinate system on the base coordinate system, required respectively for the teaching operations are stored in the plurality of working coordinate system memory means. Further, the working coordinate system number command means stores the working coordinate system number into the working coordinate system number memory means. Furthermore, the hand-alignment movement-amount computing means executes computation such that the pose of the hand is brought to parallel with or perpendicularity to each axis of X, Y and Z in the working coordinate system designated by the working coordinate system number memory means, and prepares the movement-destination position and pose data. The movement-destination position and pose data are outputted to the drive means.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

The present position and pose Msc expressed by the working coordinate system are first obtained on the basis of the following equation, by the coordinate transformation means from the base coordinate system to the working coordinate system:

Msc=(Ms)$^{-1}$ * Mbc

Subsequently, the movement-destination position and pose expressed by the working coordinate system are computed from the present position and pose expressed by the working coordinate system, on the basis of the following equations:

Xsd=Xsc

Ysd=Ysc

Zsd=Zsc

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation means from the working coordinate system to the base coordinate system, on the basis of the following equation:

Mbd=Ms * Msd

Accordingly, the hand alignment operation is made possible in which the pose of the hand of the robot is brought to parallel with or perpendicularity to each axis of X, Y and Z in the working coordinate system. Moreover, the operator optionally selects the plurality of stored working coordinate systems during the teaching operation, and the hand alignment operation can be made possible on the selected working coordinate system.

In the sixth and seventh embodiments, it is possible to optionally select the plurality of working coordinate systems. Thus, there is produced such an advantage that the teaching operation can further be made easy, in addition to the advantages of the fifth embodiment.

According to the eighth embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a pose memory means for storing therein data brought to a movement-destination pose in case where hand alignment is instructed;

a working coordinate system memory means;

a coordinate transformation means from a base coordinate system to a working coordinate system;

a coordinate transformation means from the working coordinate system to the base coordinate system;

a hand-alignment movement-amount computing means for judging whether or not a pose aligned on the working coordinate system is brought to a destination pose and a stored optional pose is brought to a destination pose, in case where the hand alignment is instructed, to compute movement-destination position and pose, thereby outputting the computed movement-destination position and pose to the drive means;

a hand alignment command means for instructing the hand alignment in which the pose aligned on the working coordinate system is brought to the destination pose to the hand-alignment movement-amount computing means; and a hand alignment command means for instructing the hand alignment in which the stored optional pose is brought to the destination pose to the hand-alignment movement-amount computing means.

In the eighth embodiment, the pose data of the hand required for the teaching operation are stored in the pose memory means. Further, the data indicating the working coordinate system on the base coordinate system is stored in the working coordinate system memory means. Furthermore, the hand-alignment and movement-amount computing means prepares the movement-destination position and pose data with the data of the present-position data memory means as the movement position and with the data of the pose memory means as the movement destination pose, in the case where the hand alignment is instructed in which the stored optional pose is brought to the destination pose. The prepared movement-destination position and pose data are outputted to the drive means. Moreover, the working coordinate system memory means executes computation such that the pose of the hand is brought to parallel with or perpendicularity to each axis of X, Y and Z in the working coordinate system, in the case where the hand alignment is instructed in which the pose aligned on the working coordinate system is brought to the destination pose. The working coordinate system memory means prepares the movement destination position and pose data, and outputs the same to the drive means.

A computing method will be described below in the case where the hand alignment is instructed in which the stored optional pose is brought to the destination pose. Here, assuming that a present position is (Xc, Yc, Zc), a stored pose is (Am, Bm, Cm), and movement-destination position and pose due to the computation results are (X, Y, Z, A, B, C), the following relations are obtained:

X=Xc

Y=Yc

Z=Zc

A=Am

B=Bm

C=Cm

Subsequently, a computing method will be described below in the case where the hand alignment is instructed in which the pose aligned on the working coordinate system is brought to the destination pose. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(\underline{M})^{-1}$ indicates an inverse matrix of a matrix $\underline{M}$.

The present position and pose Msc expressed by the working coordinate system are first obtained on the basis of the following equation, by the coordinate transformation means from the base coordinate system to the working coordinate system:

$$Msc=(Ms)^{-1} * Mbc$$

Subsequently, the movement-destination position and pose expressed by the working coordinate system are computed from the present position and pose expressed by the working coordinate system, on the basis of the following equations:

$$Xsd=Xsc$$

$$Ysd=Ysc$$

$$Zsd=Zsc$$

In case of $Asc \geq 0$: $Asd=90° \times ((Asc+45°)\yen 90°)$

In case of $Asc<0$: $Asd=90° \times ((Asc-45°)\yen 90°)$

In case of $Bsc \geq 0$: $Bsd=90° \times ((Bsc+45°)\yen 90°)$

In case of $Bsc<0$: $Bsd=90° \times ((Bsc-45°)\yen 90°)$

In case of $Csc \geq 0$: $Csd=90° \times ((Csc+45°)\yen 90°)$

In case of $Csc<0$: $Csd=90° \times ((Csc-45°)\yen 90°)$

Subsequently, the movement-destination position and pose Mbd expressed by the base coordinate system are obtained by the coordinate transformation means from the working coordinate system to the base coordinate system, on the basis of the following equation:

$$Mbd=Ms * Msd$$

Accordingly, it is possible to bring even the pose which is not in parallel with or perpendicular to each axis of X, Y and Z in the base coordinate system, to the destination pose of the hand alignment operation. Further, the hand alignment operation is made possible in which the pose of the hand of the robot is brought to parallel with or perpendicularity to each axis of X, Y and Z in the working coordinate system. Moreover, the operator can optionally select the hand alignment operation in which the stored optional pose is brought to the destination pose, and the hand alignment operation in which the pose aligned on the working coordinate system is brought to the destination pose, during the teaching operation.

According to the ninth embodiment, there is provided a control system for a robot having a hand, the control system having a hand alignment function of moving a pose of the hand of the robot automatically to a predetermined pose, without changing a present position of the hand of the robot, the control system comprising:

a drive means;

a present-position data memory means for storing therein the present position of the hand of the robot;

a present-pose data memory means for storing therein a present pose of the hand of the robot;

a pose memory means for storing therein data brought to a movement destination pose in the case where hand alignment is instructed;

a working coordinate system memory means;

a coordinate transformation means from a base coordinate system to a working coordinate system;

a coordinate transformation means from the working coordinate system to the base coordinate system;

a hand-alignment system memory means for storing therein data indicating whether or not the pose aligned on the working coordinate system is brought to the destination pose and the stored optional pose is brought to the destination pose;

a hand-alignment system command means for instructing the hand alignment system to the hand-alignment system memory means;

a hand-alignment movement-amount computing means for judging whether or not a pose aligned on the working coordinate system is brought to a destination pose, and a stored optional pose is brought to a destination pose, in the case where the hand alignment is instructed, to compute movement-destination position and pose, thereby outputting the computed movement-destination position and pose to the drive means; and a hand alignment command means for instructing the hand alignment to the hand-alignment movement-amount computing means.

In the ninth embodiment, the pose data of the hand, required for the teaching operation are stored in the pose memory means. Further, the data indicating the working coordinate system on the base coordinate system are stored in the working coordinate system memory means. Furthermore, the hand-alignment system command means stores the hand alignment system into the hand alignment-system memory means. Moreover, in the case where the hand alignment is instructed, the hand-alignment and movement-amount computing means prepares the movement-destination position and pose data with the data of the present-position data memory means as the movement destination position and with the data of the pose memory means as the movement destination pose, in the case where the hand alignment system is the system in which the stored optional pose is brought to the destination pose. The prepared movement-destination position and pose data are outputted to the drive means. Furthermore, in the case where the hand alignment system is the system in which the pose aligned on the working coordinate system is brought to the destination pose, the hand-alignment movement-amount computing means executes computation such that the pose of the hand is brought to parallel with or perpendicularity to each axis of X, Y and Z in the working coordinate system. The hand-alignment movement-amount computing means prepares the movement-destination position and pose data, and outputs the same to the drive means.

A computing method will be described below in the case of the system in which the stored optional pose is brought to the destination pose. Here, assuming that a present position is $(Xc, Yc, Zc)$, a stored pose is $(Am, Bm, Cm)$, and movement-destination position and pose due to the computation results are $(X, Y, Z, A, B, C)$, the following relations are obtained:

$X=Xc$ $Y=Yc$ $Z=Zc$ $A=Am$ $B=Bm$ $C=Cm$

Subsequently, a computing method will be described below in the case of the system in which the pose aligned on the working coordinate system is brought to the destination pose. Generally, a position can be expressed by a matrix having three rows and one column, and a pose can be expressed by a rotating matrix having three rows and three columns, while position and pose can be expressed by a matrix having four rows and four columns.

Here, it is assumed that the present position and pose expressed by the base coordinate system are (Xbc, Ybc, Zbc, Abc, Bbc, Cbc), the movement-destination position pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

The present position and pose Msc expressed by the working coordinate system are first obtained on the basis of the following equation, by the coordinate transformation means from the base coordinate system to the working coordinate system:

$$Msc = (Ms)^{-1} * Mbc$$

Subsequently, the movement-destination position and pose expressed by the working coordinate system are computed from the present position and pose expressed by the working coordinate system, on the basis of the following equations:

$$Xsd = Xsc$$

$$Ysd = Ysc$$

$$Zsd = Zsc$$

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation means from the working coordinate system to the base coordinate system, on the basis of the following equation:

$$Mbd = Ms * Msd$$

Accordingly, it is made possible that even the pose which is not in parallel with or perpendicular to each axis of X, Y and Z in the base coordinate system is brought to the destination pose of the hand alignment operation. Moreover, the hand alignment operation can be made possible in which the pose of the hand of the robot is brought in parallel with or perpendicular to each axis (X, Y and Z) in the working coordinate system. Furthermore, during the teaching operation, the operator can optionally select the hand alignment operation in which the stored optional pose is brought to the destination pose, and the hand alignment operation in which the pose aligned on the working coordinate system is brought to the destination pose.

In the eighth and ninth embodiments, it is possible for the operator during the teaching operation to optionally select the hand alignment system in which the stored optional pose is brought to the destination pose, and the hand alignment system in which the pose aligned on the working coordinate system is brought to the destination pose. Thus, there is produced such an advantage the teaching operation is made further easy, in addition to the advantages of the previous embodiments.

Other objects and features of this invention will become understood from the following description with reference to the accompanying drawings.

BRIEF DESCRIPTION OF THE DRAWINGS

FIG. 2 is a view for explanation, with a control system shown in FIG. 1 described from the viewpoint of a software, showing a data structure;

FIG. 5 is a view for explanation, with a control system shown in FIG. 4 described from the viewpoint of a software, showing a data structure;

FIG. 9 is a view for explanation, with a control system shown in FIG. 8 described from the viewpoint of a software, showing a data structure;

FIG. 13 is a view for explanation, with a control system shown in FIG. 12 described from the viewpoint of a software, showing a data structure;

FIG. 14 is a flow chart, with the control system shown in FIG. 12 described from the viewpoint of the software, showing a flow of a program at pose number command;

FIG. 28 is a view for explanation, with a control system shown in FIG. 27 described from the viewpoint of a software, showing a data structure;

FIG. 35 is a view for explanation, with a control system shown in FIG. 34 described from the viewpoint of a software, showing a data structure;

FIG. 36 is a flow chart, with the control system shown in FIG. 1 described from the viewpoint of the software, showing a flow of a program;

DESCRIPTION OF THE EMBODIMENTS

Figure 3:
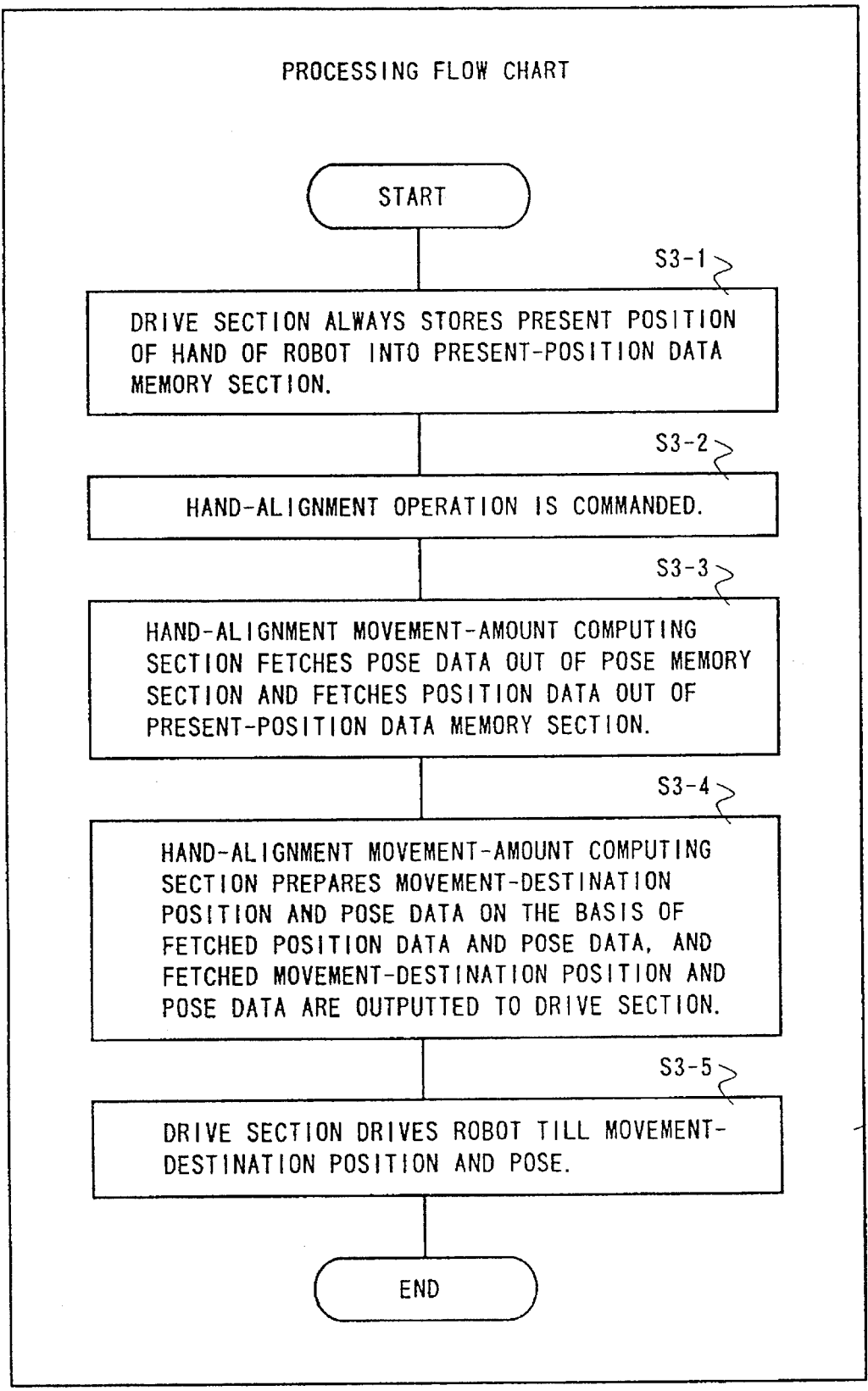
FIG. 3 is a flow chart, with the control system shown in FIG. 1 described from the viewpoint of the software, showing a flow of a program.

A first embodiment of the invention will be described below with reference to FIGS. 1 through 3 of the accompanying drawings.

Figure 1:
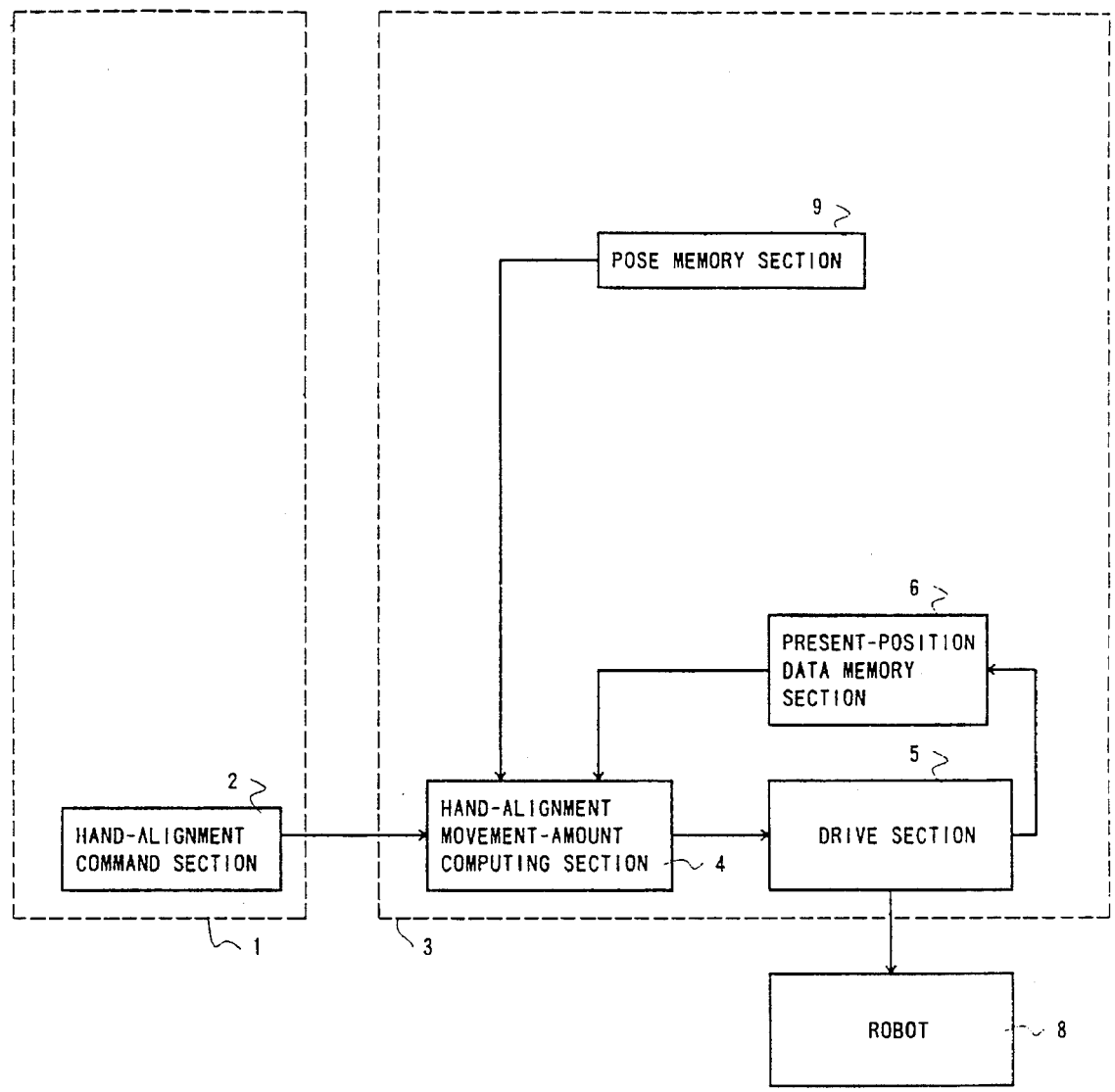
FIG. 1 is a block diagram showing a first embodiment according to the invention.

FIG. 1 is a block diagram showing a hand alignment operation according to the first embodiment. In FIG. 1, a teaching box 1 is provided with a hand-alignment command section 2. The reference numeral 3 denotes a control unit for a robot. A hand-alignment movement-amount computing section 4 computes an amount of movement of each axis of the robot at hand alignment operation. A drive section 5 commands the operation directly to a robot body 8. A current-position or present-position data memory section 6 stores therein a present position of a hand of the robot, which is resulted from driving of the robot. A pose memory section 9 is provided in which pose data of the hand required at teaching operation is stored. FIGS. 2 and 3 describe FIG. 1 from the viewpoint of software. FIG. 2 illustrates a data structure, while FIG. 3 illustrates a flow (F3) of a program.

Operation will next be described. In FIGS. 1 through 3, according to step S-1 the drive section 5 always stores a current or present position (2-1) of the hand of the robot into the present-position data memory section 6. Stored in the pose memory section 9 are pose data (2-3) of the hand which are required for the teaching operation.

Then in step S3-2, an operator commands hand alignment operation by use of the teaching box 1. The hand-alignment command section 2 outputs a hand alignment command (2-4) to the hand-alignment movement-amount computing section 4. In step S3-3, the hand-alignment movement-amount computing section 4 fetches pose data (2-3) out of the pose memory section 9, and fetches position data (2-1) out of the present-position data memory section 6. In step S3-4, the hand-alignment movement-amount computing section 4 prepares the movement-destination position and pose data (2-2) with the fetched position data (2-1) as a movement destination position and with the fetched pose data (2-3) as a movement destination pose. Finally, in step S3-5, the prepared movement destination position and pose data (2-2) are outputted to the drive section 5.

That is, assuming that a present position is (Xc, Yc, Zc), a stored pose is (Am, Bm Cm), and movement-destination position and pose due to the computing results are (X, Y, Z, A, B, C), the following relations are produced:

$X = Xc$ $Y = Yc$ $Z = Zc$ $A = Am$ $B = Bm$ $C = Cm$

Lastly, the drive section 5 drives the robot 8 to the movement destination position and pose.

A second embodiment of the invention will be described below with reference to FIGS. 4 through 7 of the accompanying drawings.

Figure 4:
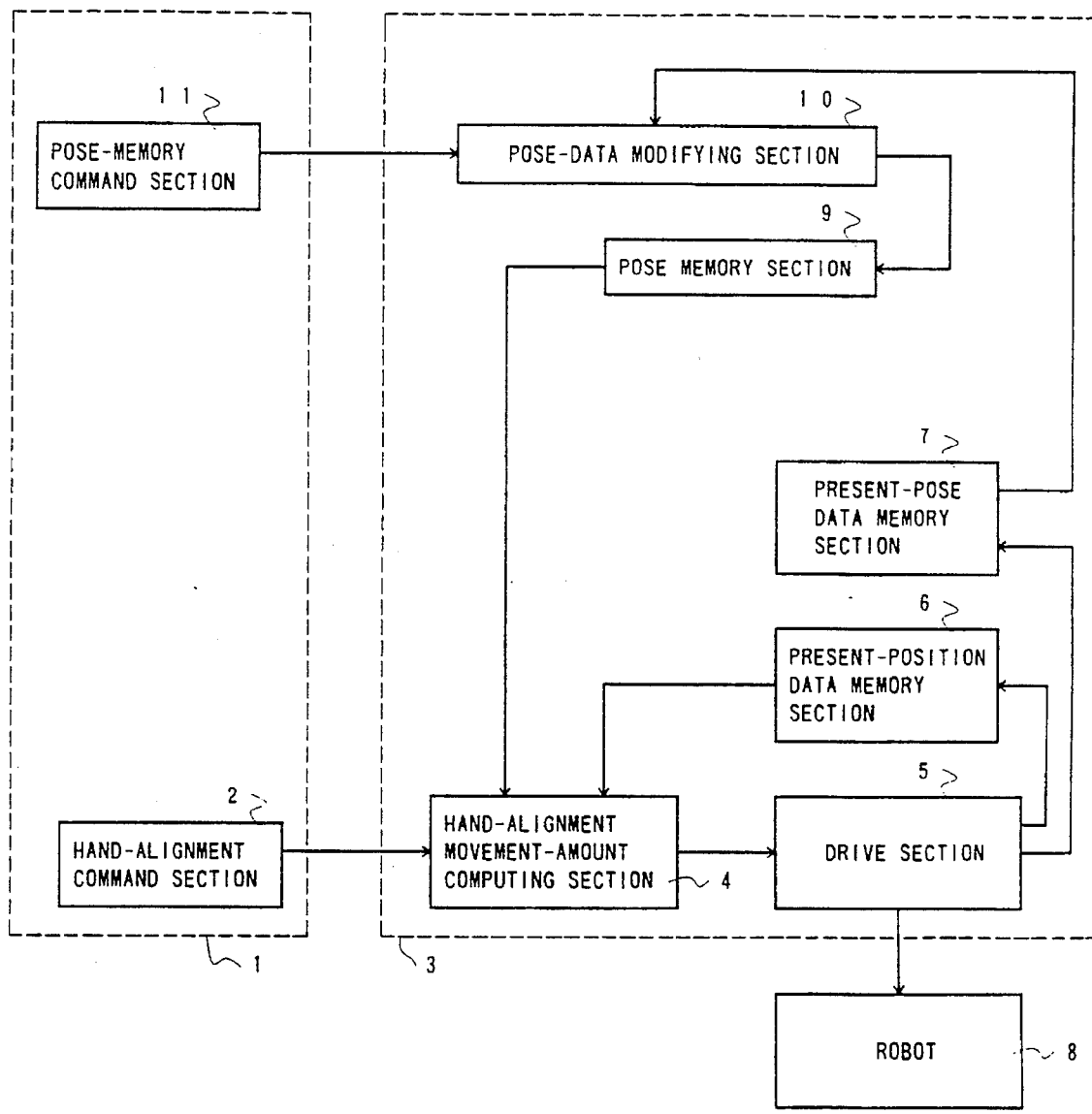
FIG. 4 is a block diagram showing a second embodiment according to the invention.
Figure 6:
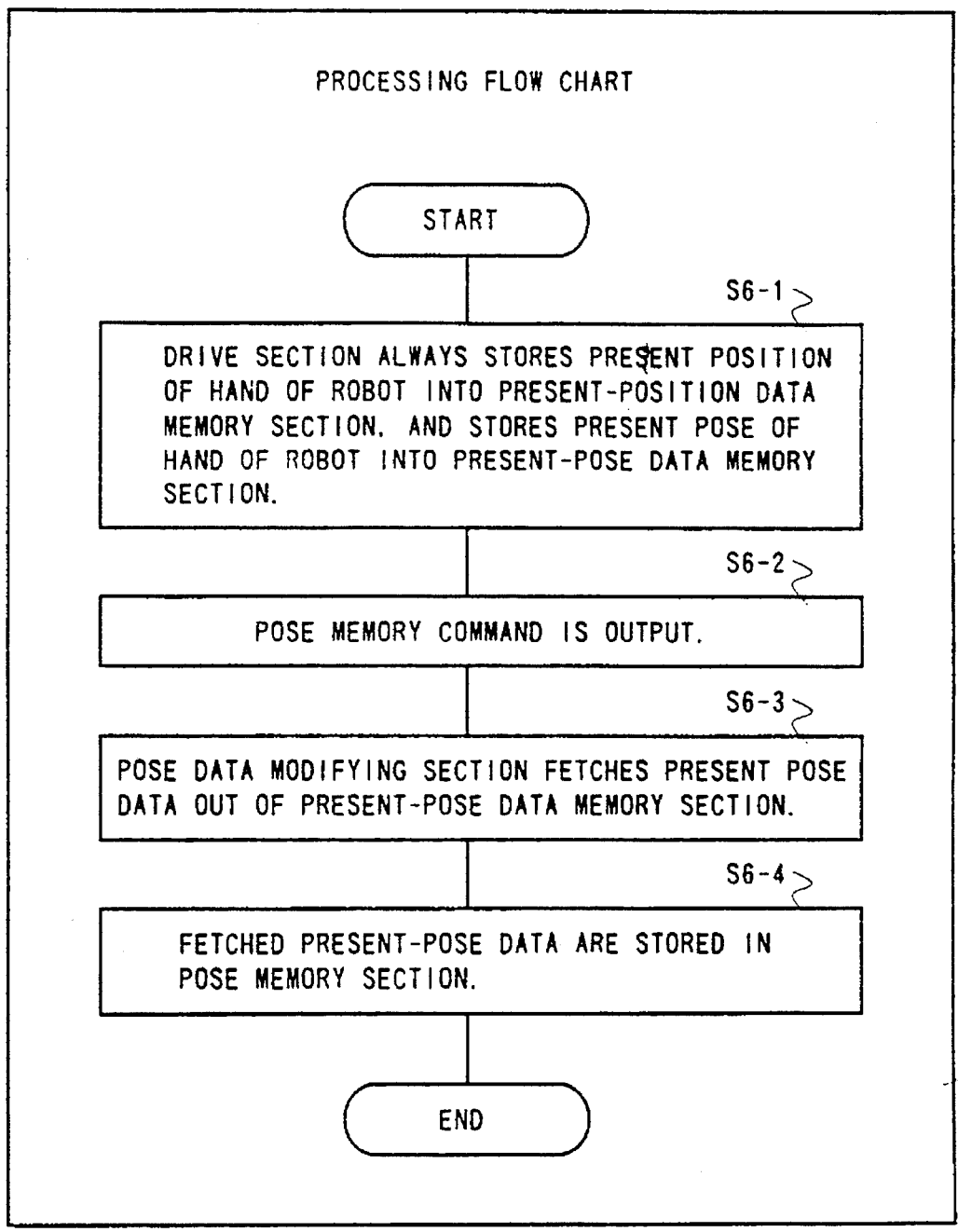
FIG. 6 is a flow chart, with the control system shown in FIG. 4 described from the viewpoint of the software, showing a flow of a program at pose memory command.
Figure 7:
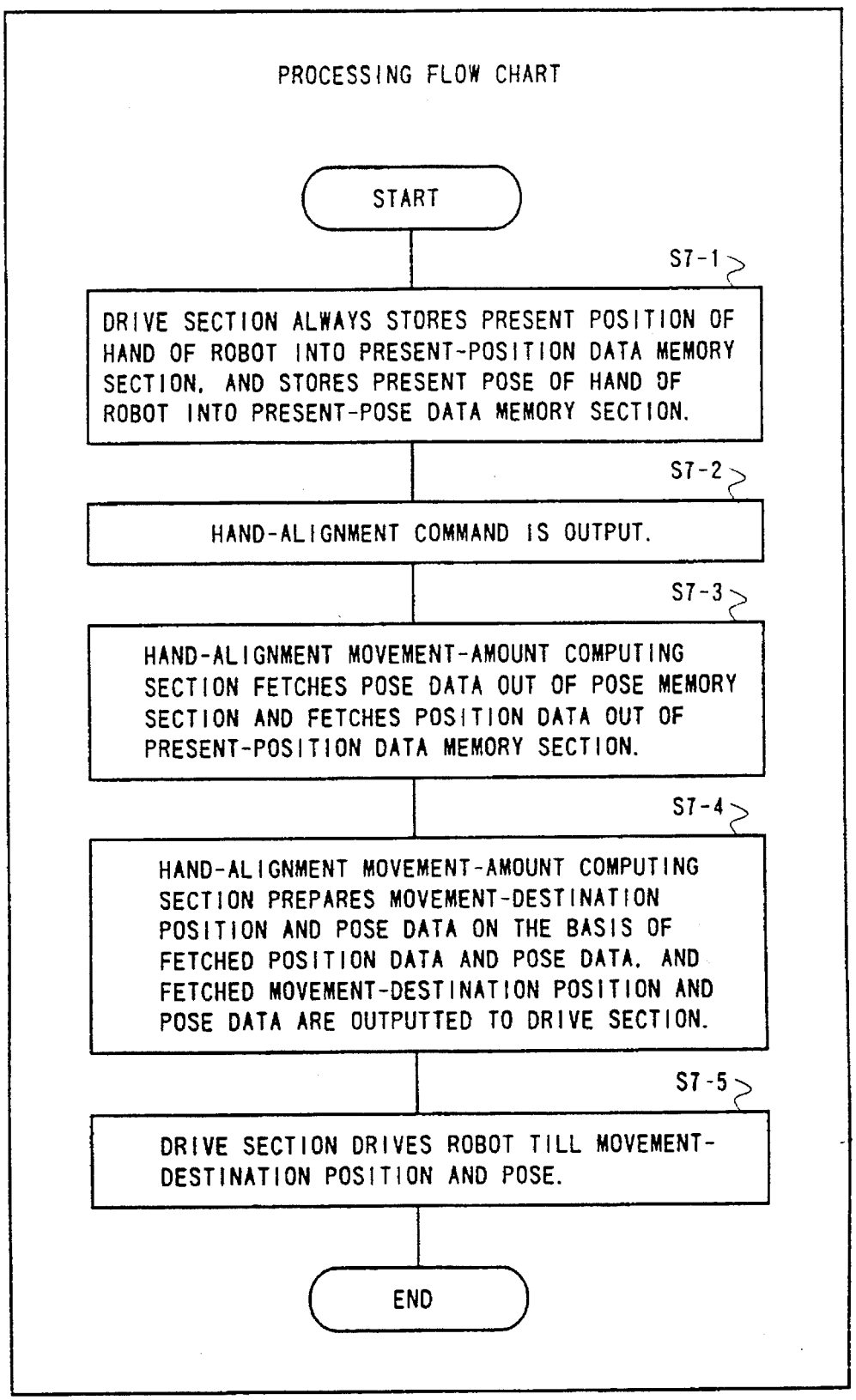
FIG. 7 is a flow chart, with the control system shown in FIG. 4 described from the viewpoint of the software, showing a flow of a program at hand alignment command.

FIG. 4 is a block diagram showing a hand alignment operation according to the second embodiment. In FIG. 4, a teaching box 1 is provided with a hand-alignment command section 2. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A pose memory section 9 is provided in which pose data of the hand required at the teaching operation is stored. A pose data modifying section 10 changes or modifies data of the pose memory section 9. A pose-memory command section 11 instructs change or modification to the pose data modifying section 10. FIGS. 5 through 7 describe FIG. 4 from the viewpoint of a software. FIG. 5 illustrates a data structure, and FIG. 6 illustrates a flow (F6) of a program in case of the pose memory command, while FIG. 7 illustrates a flow (F7) of a program in case of the hand alignment command.

Operation will next be described. In FIGS. 4 through 7, as seen in step S6-1 and S7-1, the drive section 5 always stores a current or present position (5-1) of the hand of the robot into the present-position data memory section 6, and stores the present pose (5-4) of the hand of the robot into the present-pose data memory section 7. Stored in the pose memory section 9 are pose data (5-3) of the hand which are required for the teaching operation. In FIG. 6, step s6-2, an operator instructs a pose memory command by use of the teaching box 1. The pose memory command section 11 outputs a pose memory command (5-6) to the pose-data modifying section 10. In step S6-3, the pose-data modifying section 10 fetches pose data (5-4) out of the present-pose data memory section 7, and in step S6-4, stores the fetched pose data (5-4) into the pose memory section (9).

Subsequently, in step S7-2, the operator may instruct the hand alignment operation by use of the teaching box 1. The hand-alignment command section 2 outputs the hand alignment command (5-5) to the hand-alignment movement-amount computation section 4. In step S7-3, the hand-alignment movement-amount computation section 4 fetches position data (5-3) out of the pose memory section 9, and fetches position data (5-1) out of the present-position data memory section 6. In step S7-4, the hand-alignment movement-amount computation section 4 prepares the movement-destination position and pose data (5-2) with the fetched position data (5-1) as a movement destination position and with the fetched pose data (5-3) as a movement destination position, and outputs the movement-destination position and pose data (5-2) to the drive section 5.

That is, assuming that a present position is (Xc, Yc, Zc), a stored pose is (Am, Bm Cm), and movement-destination position and pose due to the computing results are (X, Y, Z, A, B, C), the following relations are produced:

$X=Xc$
$Y=Yc$
$Z=Zc$
$A=Am$
$B=Bm$
$C=Cm$

Lastly, in step s7-5, the drive section 5 drives the robot 8 to the movement-destination position and pose.

A third embodiment of the invention will be described below with reference to FIGS. 8 through 11.

Figure 8:
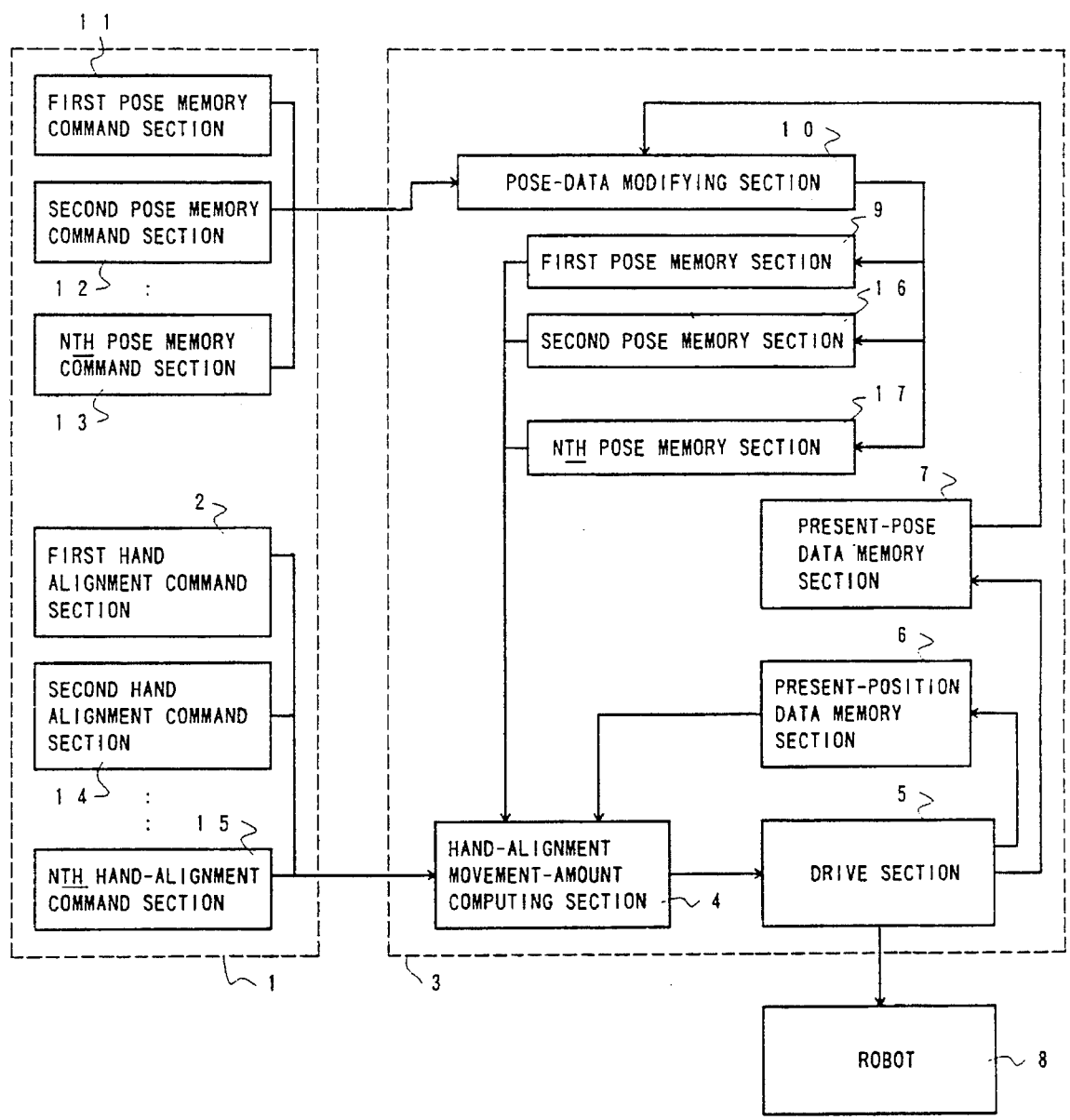
FIG. 8 is a block diagram showing a third embodiment according to the invention.

FIG. 8 is a block diagram showing a hand alignment operation according to the third embodiment. In FIG. 8, a teaching box 1 is provided with a plurality of hand alignment command sections. A first hand alignment command section 2 commands hand alignment to a first pose. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A first pose memory section 9 is provided in which pose data of the hand required for the teaching operation are stored. A pose-data modifying section 10 changes or modifies data of the pose memory sections. A first pose memory command section 11 instructs modification to the pose data modifying section 10. A second pose memory command section 12 instructs modification to the pose data modifying section 10. An nth pose memory command section 13 instructs modification to the pose-data modifying section 10. A second hand-alignment command section 14 commands hand alignment to a second pose. An nth hand-alignment command section 15 commands hand alignment to an nth pose. A second pose memory section 16 is provided in which pose data of the hand required for the teaching operation are stored. An nth pose memory section 17 is provided in which pose data of the hand required for the teaching operation are stored.

Figure 10:
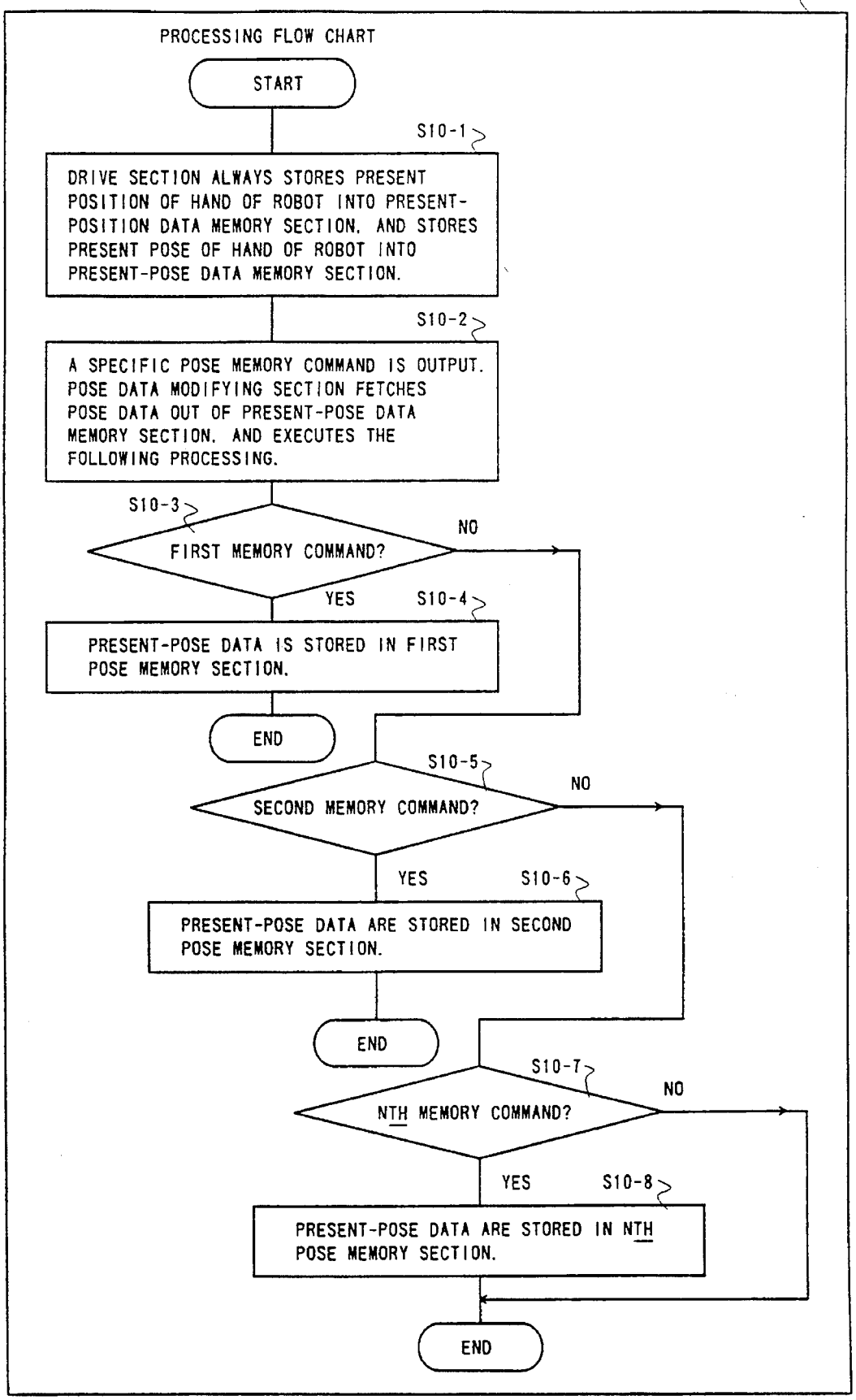
FIG. 10 is a flow chart, with the control system shown in FIG. 8 described from the viewpoint of the software, showing a flow of a program at pose memory command.
Figure 11:
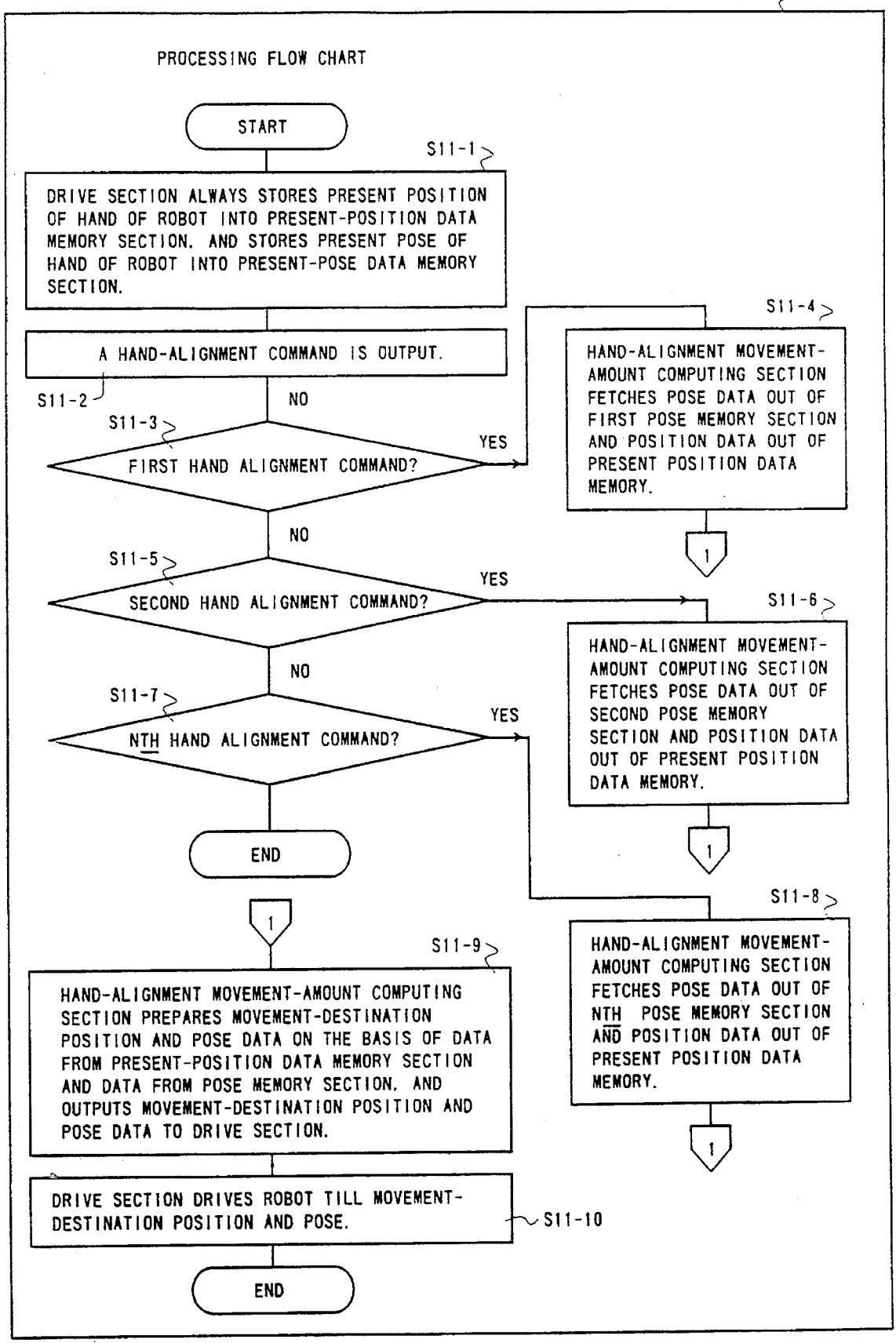
FIG. 11 is a flow chart, with the control system shown in FIG. 8 described from the viewpoint of the software, showing a flow of a program at hand alignment command.

FIGS. 9 through 11 describe FIG. 8 from the viewpoint of software. FIG. 9 illustrates a data structure, and FIG. 10 illustrates a flow (F10) of a program in case of the pose memory command, while FIG. 11 illustrates a flow (F11) of a program in case of the hand alignment command.

Operation will next be described. In FIGS. 8 through 11, as seen in step S10-1 and S11-1, the drive section 5 always stores a current or present position (5-1) of the hand of the robot into the present-position data memory section 6, and stores the present pose (5-4) of the hand of the robot into the present-pose data memory section 7. Stored in the first pose memory section 9, the second pose memory section 16 and the nth pose memory section 17 are pose data (9-3) of the hand which are required respectively for teaching operations. First, as seen in step S10-2, an operator instructs the output of a selected pose memory command by use of the teaching box 1. Then the pose data modifying section 10 fetches the pose data (9-4) out of the present-pose data memory section 7, for storage of the fetched pose data (9-4) into a designated pose memory section 16. Identification of the proper memory is made by heating in blocks S10-3, S10-5 and S10-7. If the second pose memory command section is selected, the second pose memory command section 12 outputs, to the pose data modifying section 10, the pose memory command (9-6) which indicates that the pose memory section intended for modification is the second pose memory section 16. Finally, in steps S10-4, S10-6 and S10-8, the fetched data in step S10-2 is stored in the appropriate memory section, here the selected second pose memory section. Here, the first pose memory command section corresponds to the first pose memory section, and the second pose memory command section corresponds to the second pose memory section, while the nth pose memory command section corresponds to the nth pose memory section.

Subsequently, as seen in FIG. 11, step S11-2, the operator instructs a hand alignment operation by use of the teaching box 1. The second hand alignment command section 14 outputs, to the hand-alignment movement-amount computing section 4, the hand alignment command (9-5) which indicates that the movement destination pose in the hand alignment is data of the second pose memory section. A check is made in steps S11-3, S11-5 and S11-7 for the identity for command. If the second hand alignment operation is selected in accordance with a decision at step S11-5, in step S11-6, the hand-alignment movement-amount computing section 4 fetches pose data (9-3) out of the designated second pose memory section 16, and fetches position data (9-1) out of the present-position data memory section 6. In step S11-9, the hand-alignment movement-amount computation section 4 prepares the movement-destination position and pose data (9-2) with the fetched position data (9-1) as a movement destination position and with the fetched pose data (9-2) as a movement destination pose, and outputs the movement-destination position and pose data (9-2) to the drive section 5.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Here, the first hand alignment command section corresponds to the first pose memory section, the second hand alignment command section corresponds to the second pose memory section, and the nth hand alignment command section corresponds to the nth pose memory section. Lastly, in step S11-10, the drive section 5 drives the robot 8 to the movement-destination position and pose.

A fourth embodiment of the invention will be described below with reference to FIGS. 12 through 16.

Figure 12:
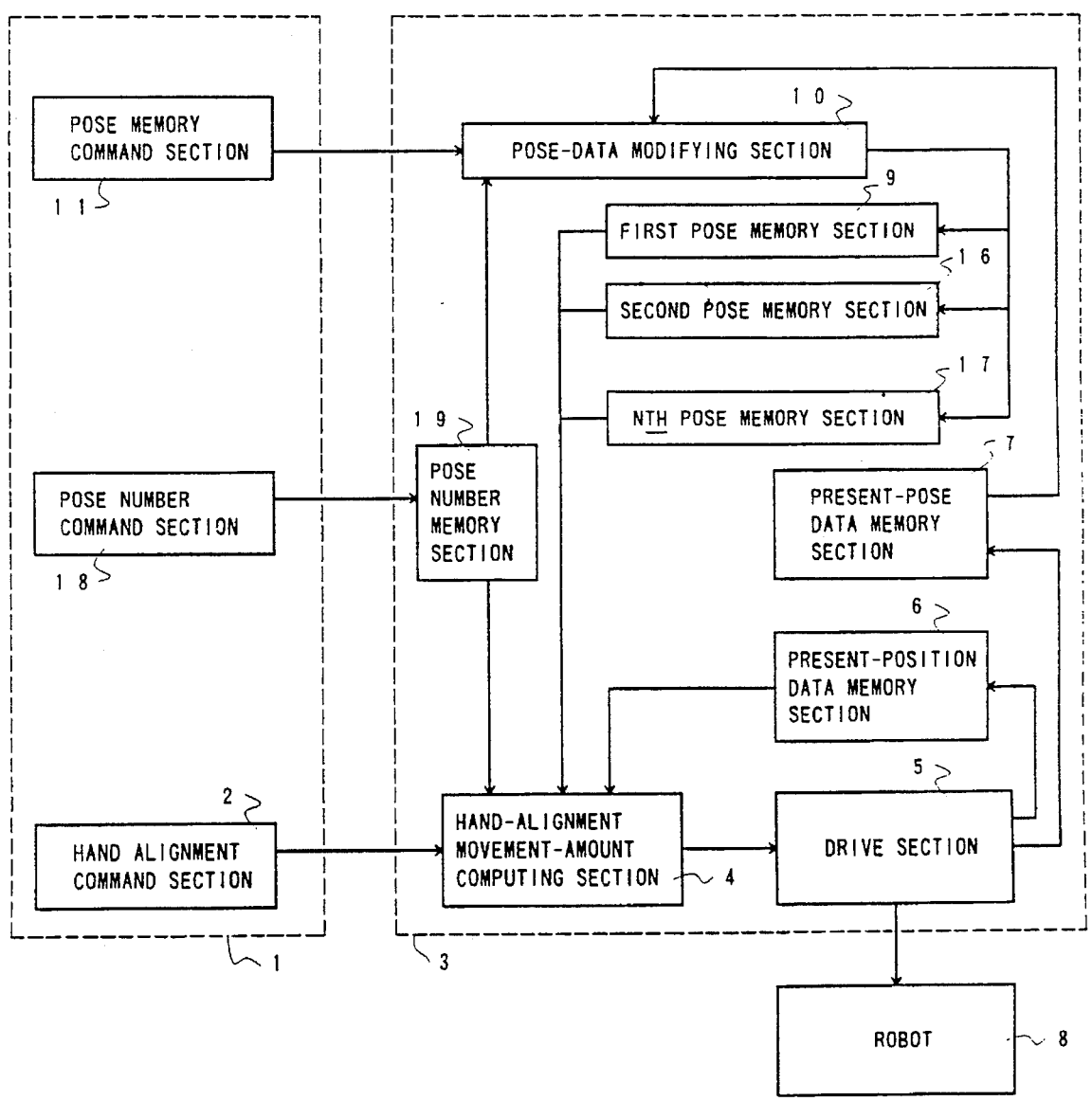
FIG. 12 is a block diagram showing a fourth embodiment according to the invention.

FIG. 12 is a block diagram showing hand alignment operation according to the fourth embodiment. In FIG. 12, a teaching box 1 is provided with a hand alignment command section 2 which commands hand alignment. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A first pose memory section 9 is provided in which pose data of the hand required for the teaching operation are stored. A pose data modifying section 10 changes or modifies data of the pose memory sections. A pose memory command section 11 instructs modification to the pose data modifying section 10. A second pose memory section 16 is provided in which the pose data of the hand required for the teaching operation are stored. An nth pose memory section 17 is provided in which the pose data of the hand required for the teaching operation are stored. A pose number command section 18 instructs a pose number which indicates the pose memory section corresponding to the pose memory command and the hand alignment command. A pose-number memory section 19 is also provided which stores therein a pose number.

Figure 15:
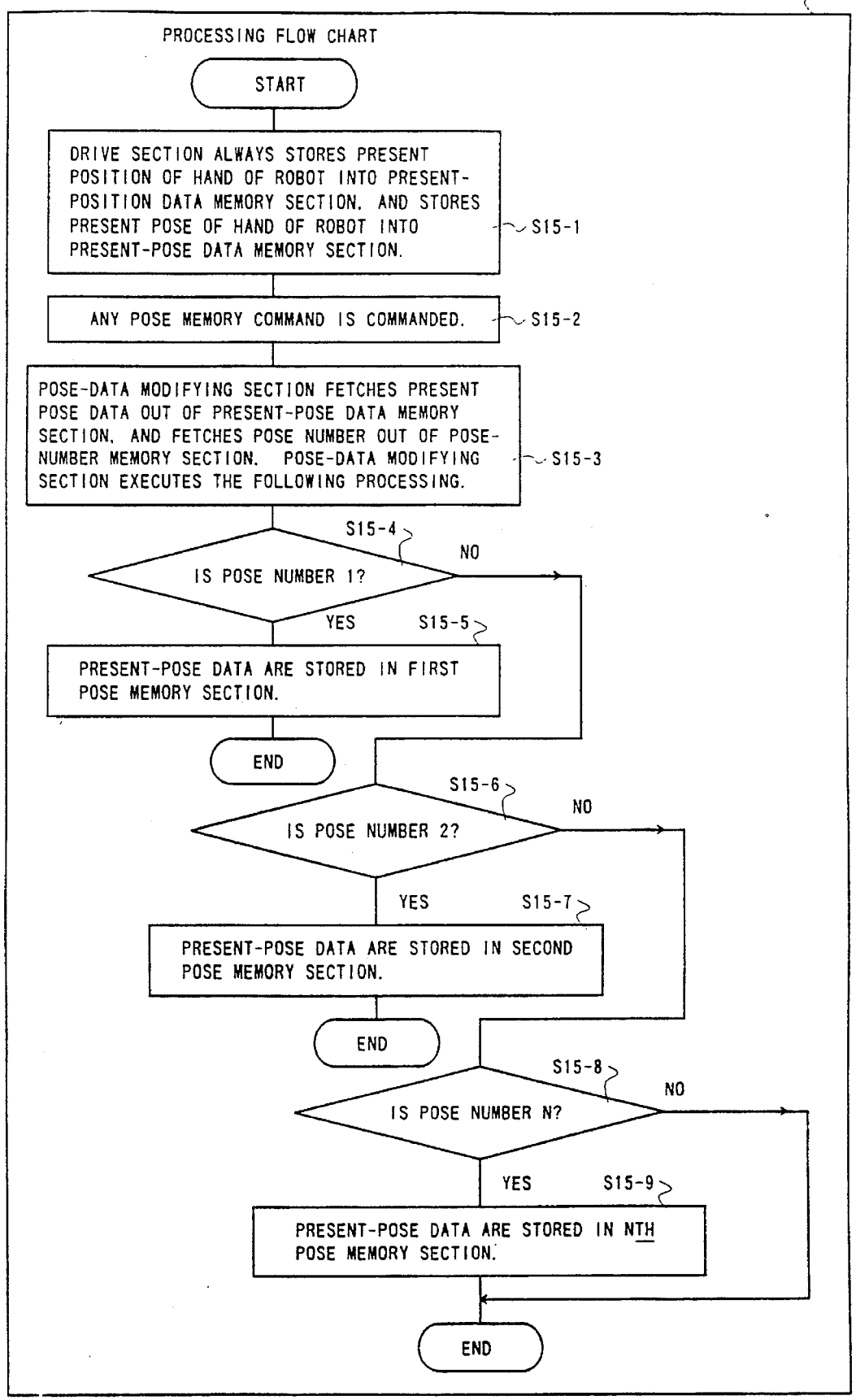
FIG. 15 is a flow chart, with the control system shown in FIG. 12 described from the viewpoint of the software, showing a flow of a program at pose memory command.
Figure 16:
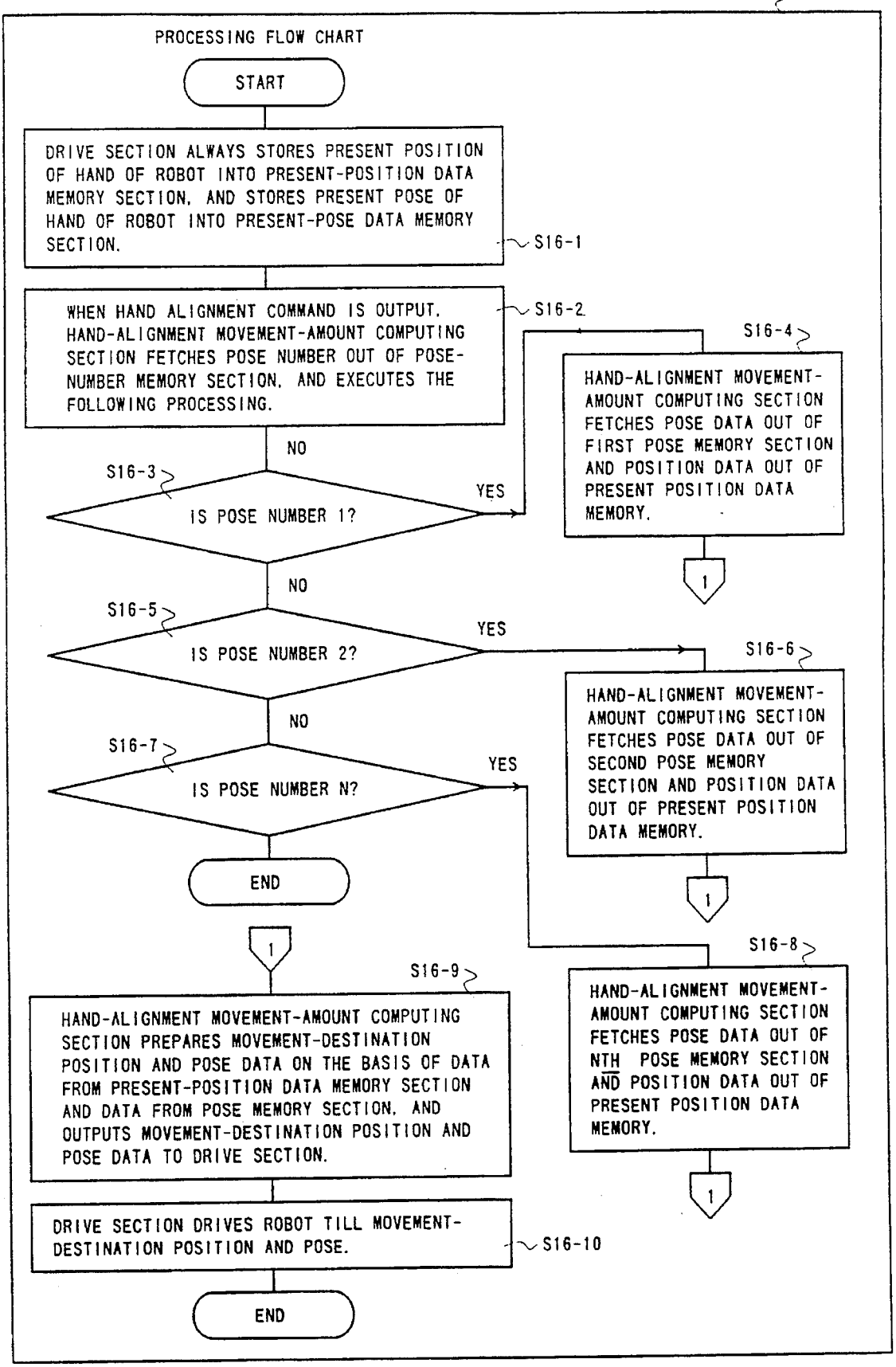
FIG. 16 is a flow chart, with the control system shown in FIG. 12 described from the viewpoint of the software, showing a flow of a program at hand alignment command.

FIGS. 13 through 16 describe FIG. 12 from the viewpoint of software. FIG. 13 illustrates a data structure. FIG. 14 illustrates a flow (F14) of a program in case of the pose number command. FIG. 15 illustrates a flow (F15) of the program in case of the pose memory commands, while FIG. 16 illustrates a flow (F16) of a program in case of the hand alignment command.

Operation will next be described. In FIGS. 12 through 16, the drive section 5 always stores a current or present position (13-1) of the hand of the robot into the present-position data memory section 6, and stores the present pose (13-4) of the hand of the robot into the present-pose data memory section 7 as seen in steps S15-1 and S16-1. Stored in the first pose memory section 9, the second pose memory section 16 and the nth pose memory section 17 are pose data (13-3) of the hand which are required respectively for the teaching operations.

An example, will be provided for explanation of the invention, where the present pose is stored as a second pose. Referring to FIG. 14, when an operator instructs the second pose by the pose number command section 18 of the teaching box 1, the pose number command is output, as seen in step S14-1. In step S14-2, the pose number command section 18 stores, in the pose number memory section 19, data (13-7) which indicate that the pose number is 2. Subsequently, with reference to FIG. 15, the operator instructs the pose memory command by use of the teaching box 1. The pose memory command section 11 outputs the pose memory command (13-6) to the pose data modifying section 10. In response to a determination that a command has been output in step S15-2, the pose data modifying section 10 fetches the pose data (9-4) out of the present-pose data memory section 7, and fetches the pose number (13-7) out of the pose number memory section 19, as seen in step S15-3. Testing of the pose number is made in steps S15-4, S15-6 and S15-8. Here, the pose number 1 corresponds to the first pose memory section, and the pose number 2 corresponds to the second pose memory section, while the pose number n corresponds to the nth pose memory section. Then in step S15-5, the pose data modifying section 10 stores the fetched pose data and pose number into the second pose memory section 16 designated by the pose number (13-7).

A case will next be described where hand alignment is practiced by section of the stored second pose, with reference to FIG. 16. When the operator instructs the second pose by use of the pose number command section 18 of the teaching box 1, the pose number command section 18 stores, in the pose number memory section 19, data (13-7) which indicate that the pose number is 2. Subsequently, the operator instructs hand alignment operation by use of the teaching box 1. The hand alignment command section 14 outputs the hand alignment command (13-5) to the hand-alignment movement-amount computing section 4. In step S16-2, the hand-alignment movement-amount computing section 4 fetches the pose number (13-7) out of the pose number memory section 19. In response to a determination that the pose number is 2, in step s16-5, the hand-alignment movement-amount computing section 4 fetches the pose data (13-3) out of the second pose memory section 16 which is designated by the pose number (13-7), and fetches the position data (13-1) out of the present-position data memory section 6, in step S16-6. Then, in step S16-5, the hand-alignment movement-amount computation section 4 prepares the movement-destination position and pose data (13-2) with the fetched position data (13-1) as a movement destination position and with the fetched pose data (13-3) as a movement destination pose, and outputs the movement-destination position and pose data (13-2) to the drive section 5.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Lastly, in step S16-10, the drive section 5 drives the robot 8 to the movement-destination position and pose. In this connection, the operation of commanding the pose number can be omitted in cases other than the case where the pose number is switched, that is, in case where the pose number the same as the previous one is commanded. A fifth embodiment of the invention will be described below with reference to FIGS. 17 through 19.

Figure 17:
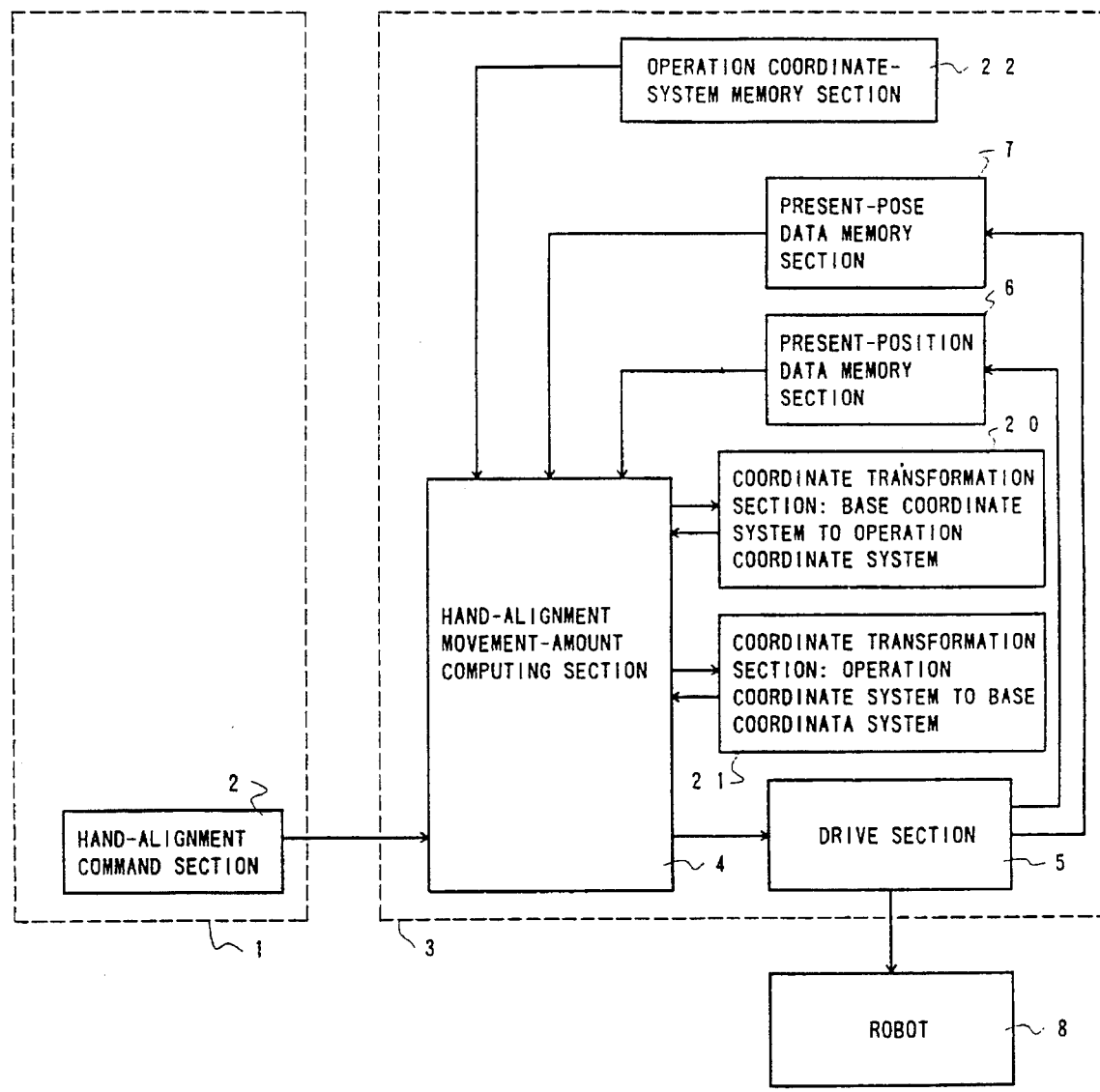
FIG. 17 is a block diagram showing a fifth embodiment according to the invention.
Figure 18:
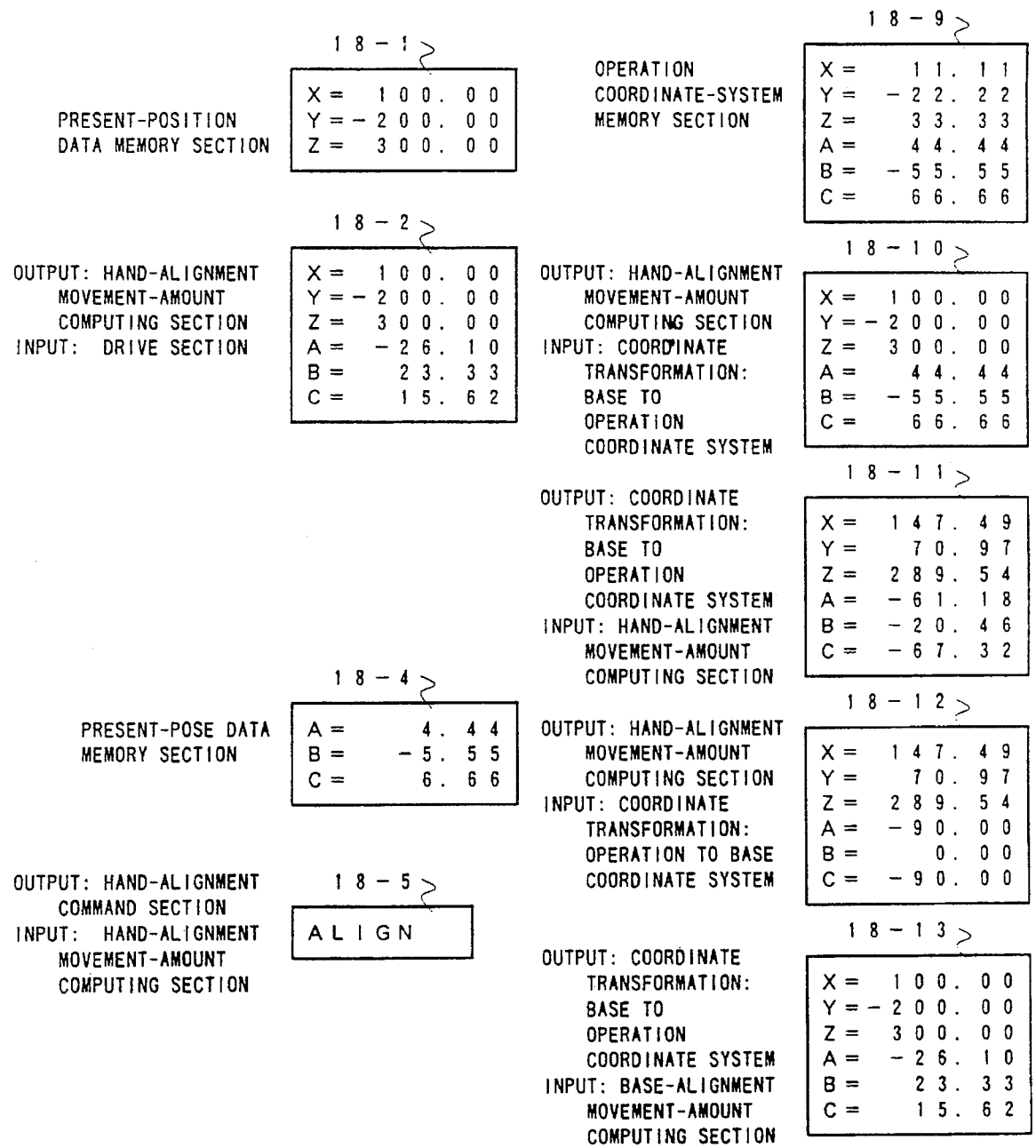
FIG. 18 is a view for explanation, with a control system shown in FIG. 17 described from the viewpoint of a software, showing a data structure.
Figure 19:
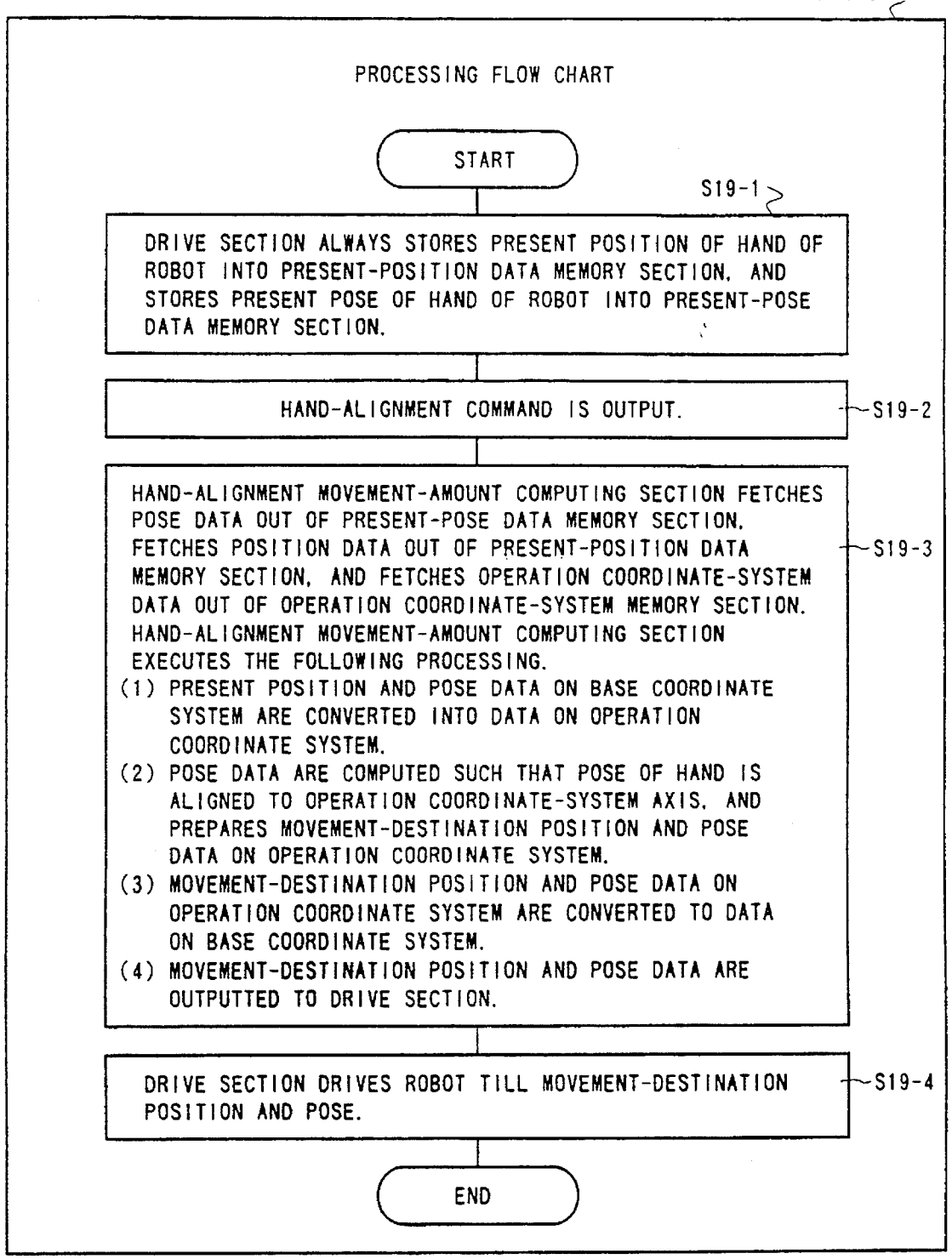
FIG. 19 is a flow chart, with the control system shown in FIG. 17 described from the viewpoint of the software, showing a flow of a program.

FIG. 17 is a block diagram showing hand alignment operation according to the fifth embodiment. In FIG. 17, a teaching box 1 is provided with a hand alignment command section 2. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot which is resulted from driving of the robot. A coordinate transformation section 20 is provided from a base coordinate system to a operation or working coordinate system. A coordinate transformation section 21 is provided from the working coordinate system to the base coordinate system. The reference numeral 22 denotes a working or operation coordinate system memory section. FIGS. 18 and 19 describe FIG. 17 from the viewpoint of software. FIG. 18 illustrates a data structure, while FIG. 19 illustrates a flow (F19) of a program.

Operation will next be described. In FIGS. 17 through 19, the drive section 5 always stores a current or present position (18-1) of the hand of the robot into the present-position data memory section 6, and stores the present pose (18-4) of the hand of the robot into the present-pose data memory section 7, as seen in step S19-1. Stored in the working coordinate system memory section 22 are data (18-9) indicating the working coordinate system on the base coordinate system.

First, an operator instructs the hand alignment operation by use of the teaching box 1. The hand alignment command section 2 outputs the hand alignment command (18-5) to the hand-alignment movement-amount computing section 4, according to step S19-2. In step S19-3, the hand-alignment movement-amount computing section 4 fetches the working coordinate system data (18-9) out of the working coordinate system memory section 22, fetches the position data (18-1) out of the present-position data memory section 6, and fetches the pose data (18-4) out of the present-pose data memory section 7. The hand-alignment movement-amount computing section 4 executes computation such that the pose of the hand is brought to parallel with or perpendicularity to each axis of X, Y and Z in the working coordinate system. The hand-alignment movement-amount computing section 4 prepares the movement-destination position and pose data (18-2), and outputs the same to the drive section 5.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are $(Xbc, Ybc, Zbc, Abc, Bbc, Cbc)$, the movement-destination position and pose expressed by the base coordinate system are $(Xbd, Ybd, Zbd, Abd, Bbd, Cbd)$, the present position and pose expressed by the working coordinate system are $(Xsc, Ysc, Zsc, Asc, Bsc, Csc)$, the movement-destination position and pose expressed by the working coordinate system are $(Xsd, Ysd, Zsd, Asd, Bsd, Csd)$, the data indicating the working coordinate system on the base coordinate system are $(Xs, Ys, Zs, As, Bs, Cs)$, the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

Present position and pose Msc expressed by the working coordinate system are first obtained by the coordinate transformation section from the base coordinate system to the working coordinate system, on the basis of the following equation:

$$Msc = (Ms)^{-1} * Mbc$$

Subsequently, the movement-destination position and pose expressed by the working coordinate system are computed from the present position and pose expressed by the working coordinate system, on the basis of the following equations:

$$Xsd = Xsc$$

$$Ysd = Ysc$$

$$Zsd = Zsc$$

In case of Asc≧0: $Asd = 90° \times ((Asc+45°) ¥ 90°)$

In case of Asc<0: $Asd = 90° \times ((Asc-45°) ¥ 90°)$

In case of Bsc≧0: $Bsd = 90° \times ((Bsc+45°) ¥ 90°)$

In case of Bsc<0: $Bsd = 90° \times ((Bsc-45°) ¥ 90°)$

In case of Csc≧0: $Csd = 90° \times ((Csc+45°) ¥ 90°)$

In case of Csc<0: $Csd = 90° \times ((Csc-45°) ¥ 90°)$

Subsequently, the movement-destination position and pose Mbd expressed by the base coordinate system are obtained by the coordinate transformation section from the working coordinate system to the base coordinate system, on the basis of the following equation:

$$Mbd = Ms * Msd$$

Lastly, according to step S19-4, the drive section 5 drives the robot 8 to the movement-destination position and pose.

A sixth embodiment of the invention will be described below with reference to FIGS. 20 through 22.

Figure 20:
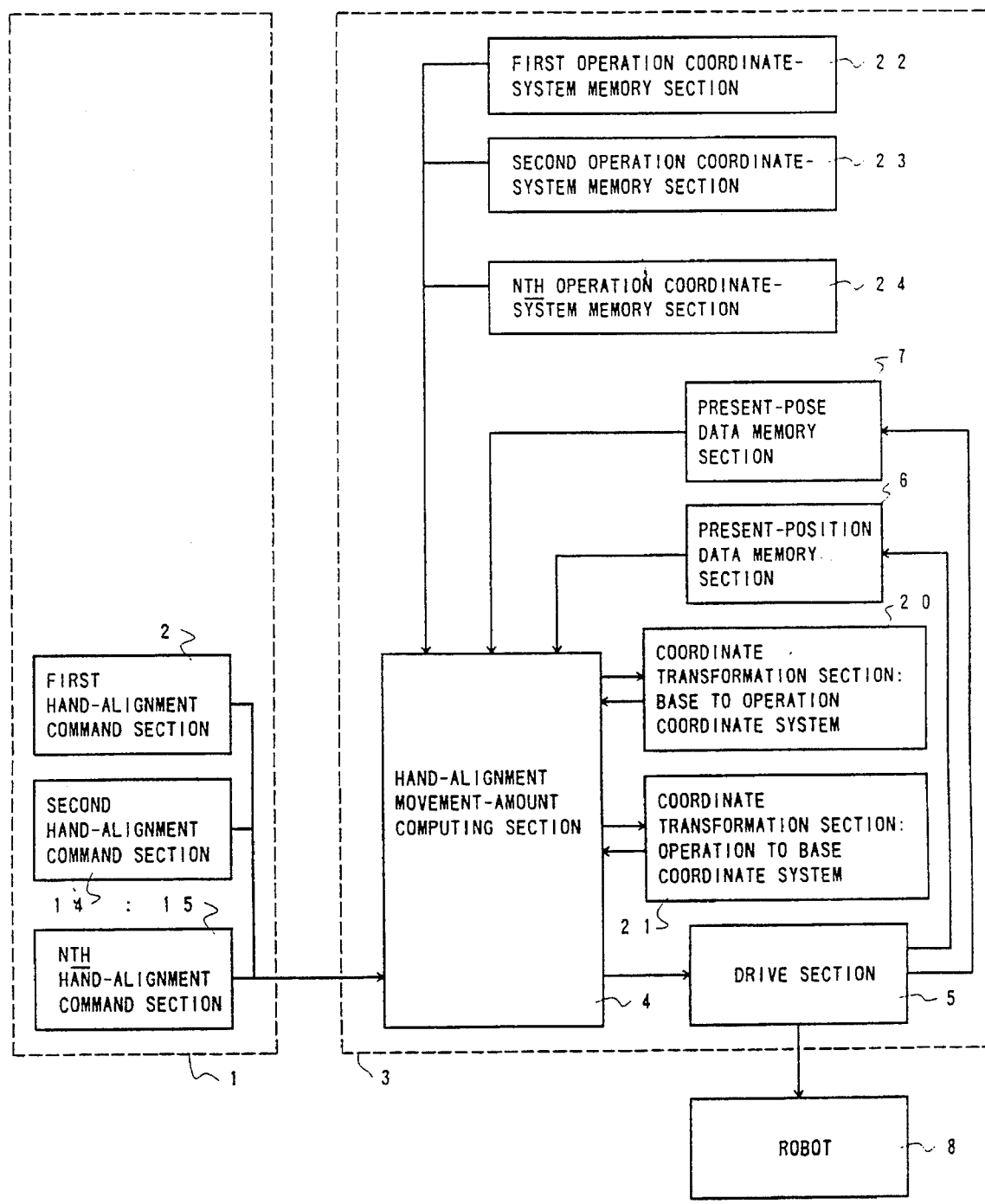
FIG. 20 is a block diagram showing a sixth embodiment according to the invention.

FIG. 20 is a block diagram showing hand alignment operation according to the sixth embodiment. In FIG. 20, a teaching box 1 is provided with a plurality of hand alignment command sections. A first hand alignment command section 2 instructs hand alignment on a first working coordinate system. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A second hand alignment command section 14 instructs the hand alignment on the second working coordinate system. An nth hand alignment command section 15 instructs the hand alignment on an nth working coordinate system. A coordinate transformation section 20 is provided from a base coordinate system to a working coordinate system. A coordinate transformation section 21 is provided from the working coordinate system to the base coordinate system. The reference numeral 22 denotes a first working coordinate system memory section, and the reference numeral 23 denotes a second working coordinate system memory section, while the reference numeral 24 denotes an nth working coordinate system memory section.

Figure 21:
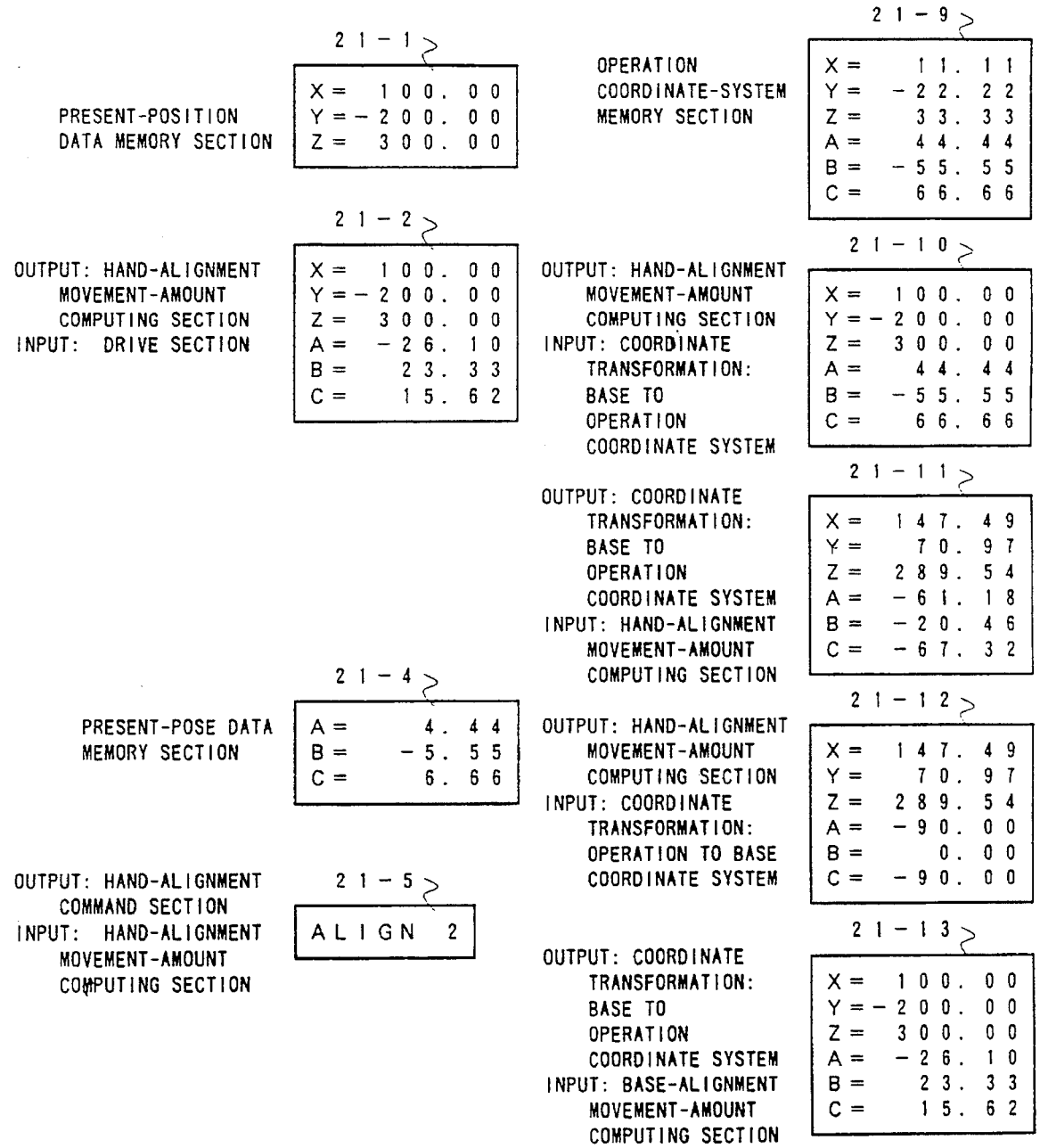
FIG. 21 is a view for explanation, with a control system shown in FIG. 20 described from the viewpoint of a software, showing a data structure.
Figure 22:
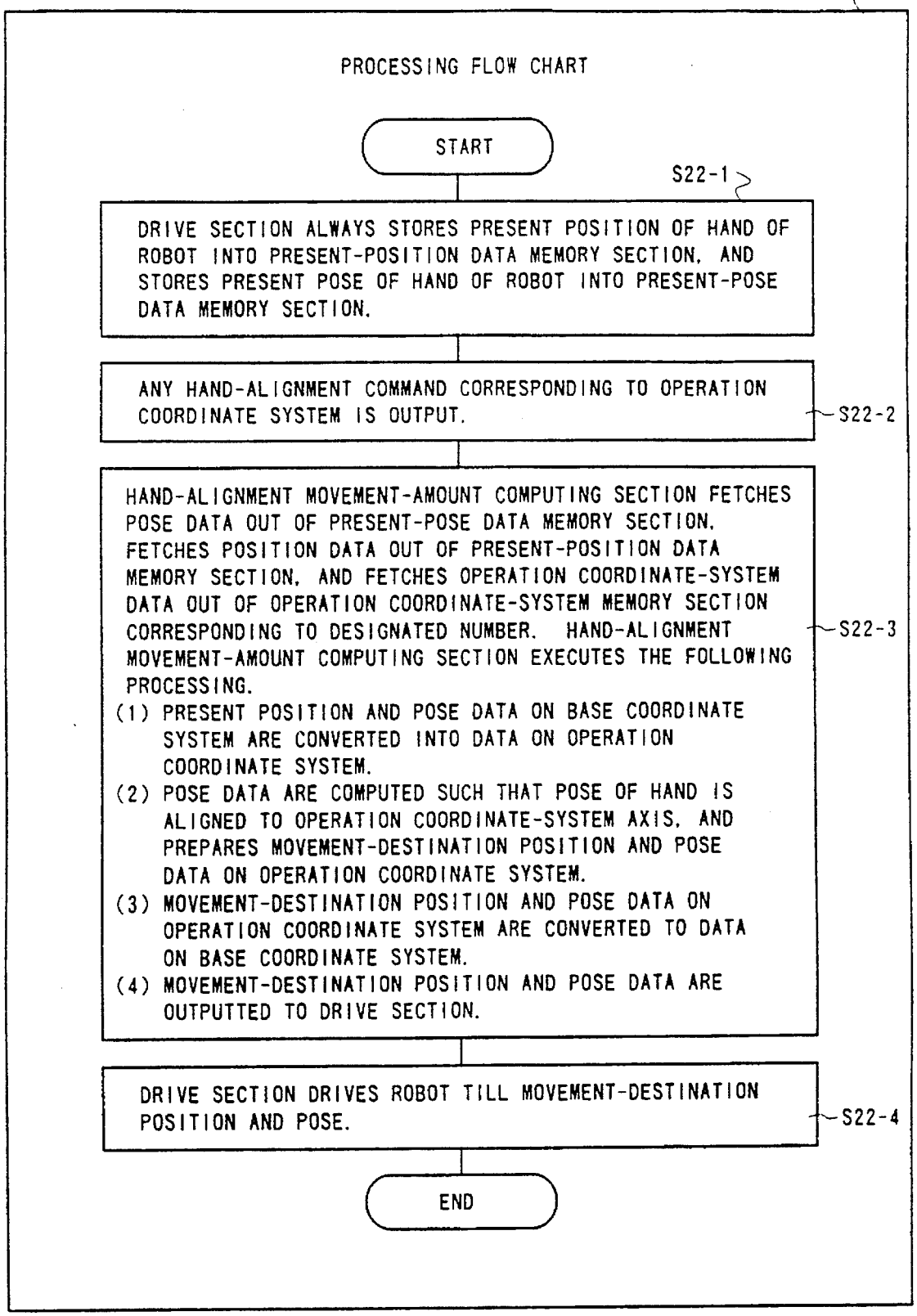
FIG. 22 is a flow chart, with the control system shown in FIG. 20 described from the viewpoint of the software, showing a flow of a program.

FIGS. 21 and 22 describe FIG. 20 from the viewpoint of software. FIG. 21 illustrates a data structure, while FIG. 22 illustrates a flow (F22) of a program.

Operation will next be described. In FIGS. 20 through 22, according to step S22-1, the drive section 5 always stores a current or present position (21-1) of the hand of the robot into the present-position data memory section 7, and stores the present pose (21-4) of the hand of the robot into the present-pose data memory section 6. Stored in the first working coordinate system memory section 22, the second working coordinate system memory section 23 and the nth working coordinate system memory section 24 are data (21-9) respectively indicating the working coordinate systems on the base coordinate system.

In a next step S22-2, an operator instructs second hand alignment operation by use the teaching box 1. The second hand alignment command section 14 outputs the hand alignment command (21-5) indicating the hand alignment at the second working coordinate system, to the hand-alignment movement-amount computing section 4. In step S22-3, the hand-alignment movement-amount computing section 4 fetches the working coordinate system data (21-9) out of the designated second working coordinate system memory section 23, fetches the position data (21-1) out of the present-position data memory section 6, and fetches the pose data (21-4) out of the present-pose data memory section 7. The hand-alignment movement-amount computing section 4 executes computation such that the pose of the hand is brought to parallel with or perpendicularity to each axis of X, Y and Z in the working coordinate system. The hand-alignment movement-amount computing section 4 prepares the movement-destination position and pose data (21-2), and outputs the same to the drive section 5.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

Present position and pose Msc expressed by the working coordinate system are first obtained by the coordinate transformation section from the base coordinate system to the working coordinate system, on the basis of the following equation:

$$Msc=(Ms)^{-1} * Mbc$$

Subsequently, the movement-destination position and pose expressed by the working coordinate system are computed from the present position and pose expressed by the working coordinate system, on the basis of the following equations:

Xsd=Xsc

Ysd=Ysc

Zsd=Zsc

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation section from the working coordinate system to the base coordinate system, on the basis of the following equation:

$$Mbd=Ms * Msd$$

Lastly, according to step S22-4, the drive section 5 drives the robot 8 till the movement-destination position and pose.

A seventh embodiment of the invention will be described below with reference to FIGS. 23 through 26.

Figure 23:
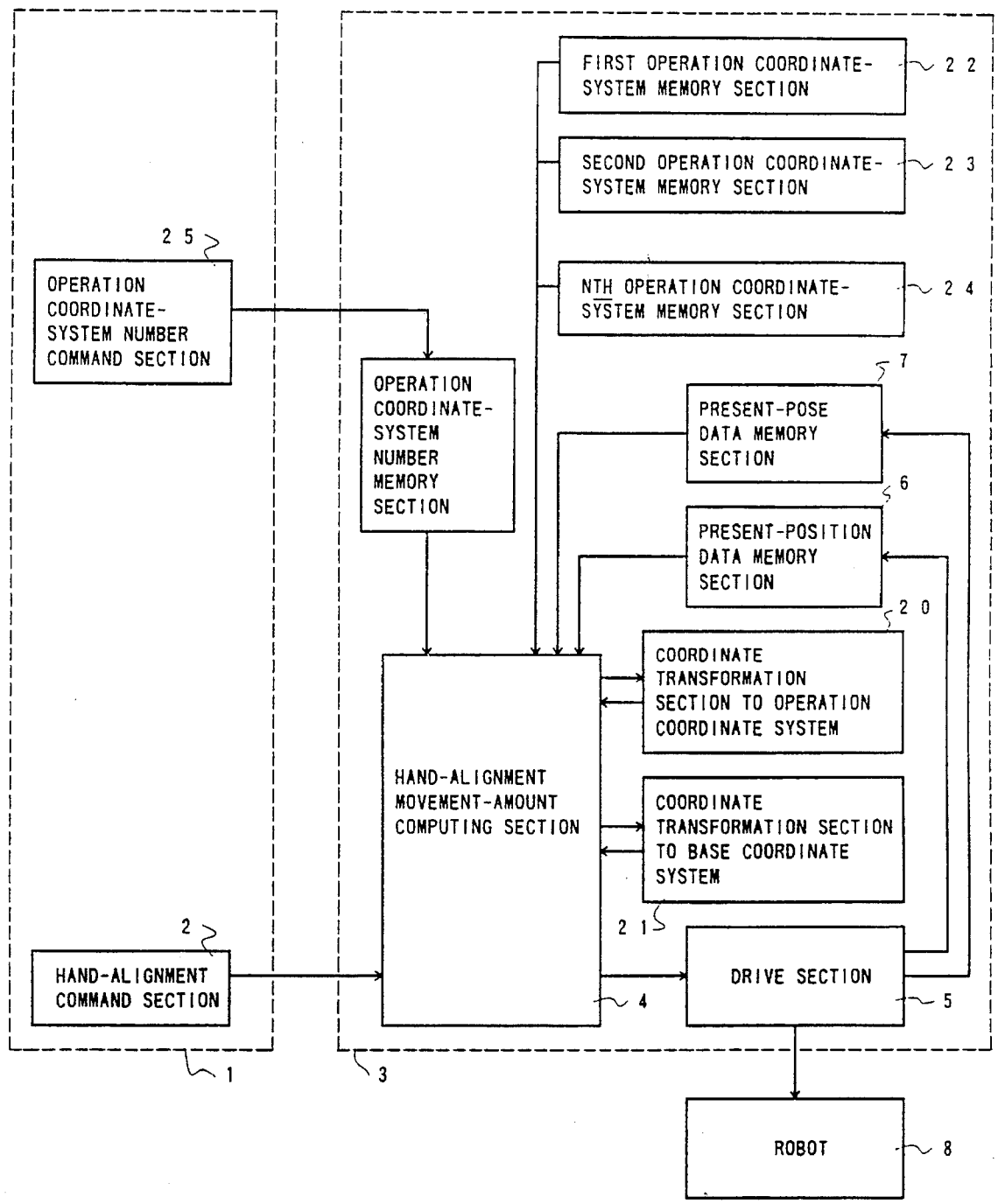
FIG. 23 is a block diagram showing a seventh embodiment according to the invention.

FIG. 23 is a block diagram showing hand alignment operation according to the invention. In FIG. 23, a teaching box 1 is provided with a hand alignment command section 2. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A coordinate transformation section 20 is provided from a base coordinate system to a working coordinate system. A coordinate transformation section 21 is provided from the working coordinate system to the base coordinate system. The reference numeral 22 denotes a first working coordinate system memory section, and the reference numeral 23 denotes a second working coordinate system memory section, while the reference numeral 24 denotes an nth working coordinate system memory section. A working coordinate system number command section 25 is provided which instructs a number of the working coordinate system intended for hand alignment. A working coordinate system number memory section 26 is provided for storing therein a working coordinate system number.

Figure 24:
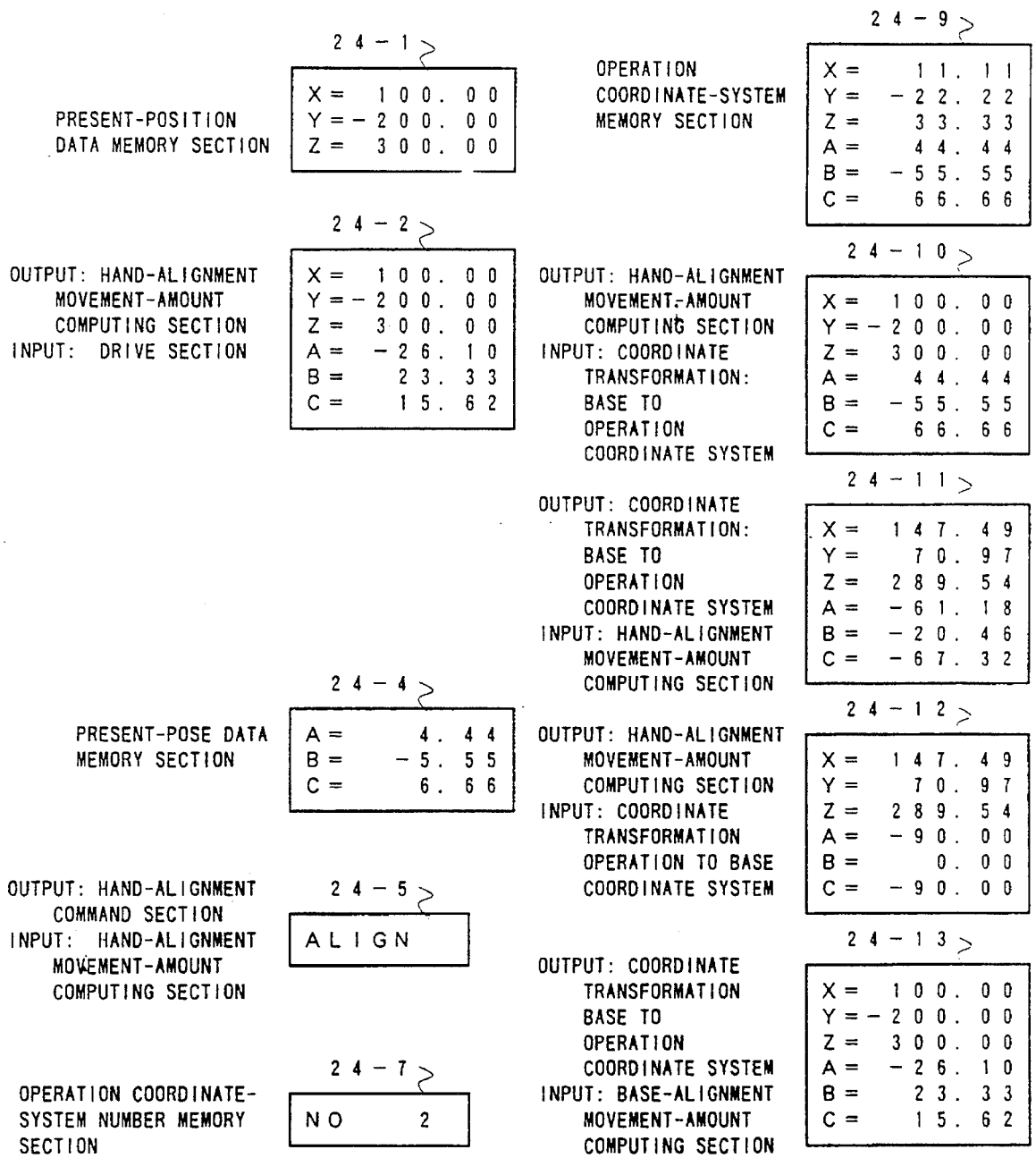
FIG. 24 is a view for explanation, with a control system shown in FIG. 23 described from the viewpoint of a software, showing a data structure.
Figure 25:
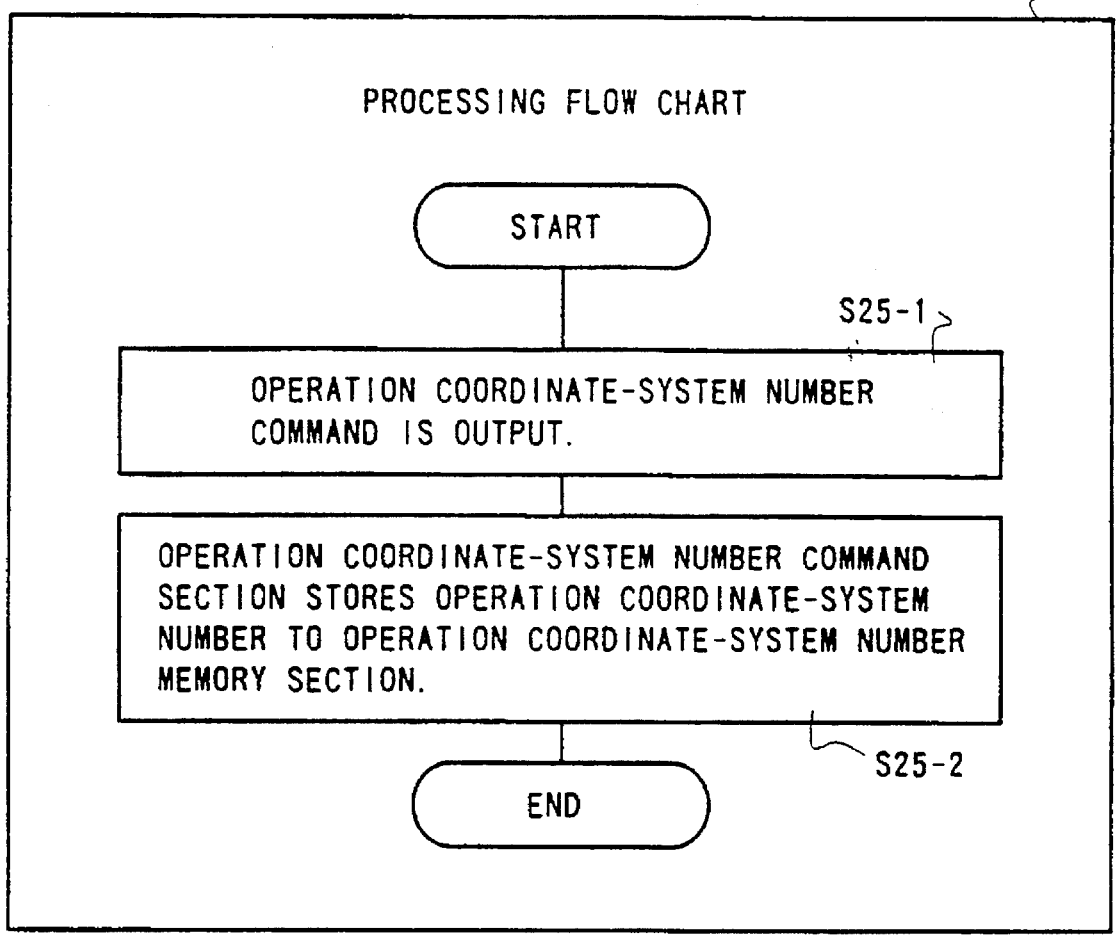
FIG. 25 is a flow chart, with the control system shown in FIG. 23 described from the viewpoint of the software, showing a flow of a program at working coordinate system number command.
Figure 26:
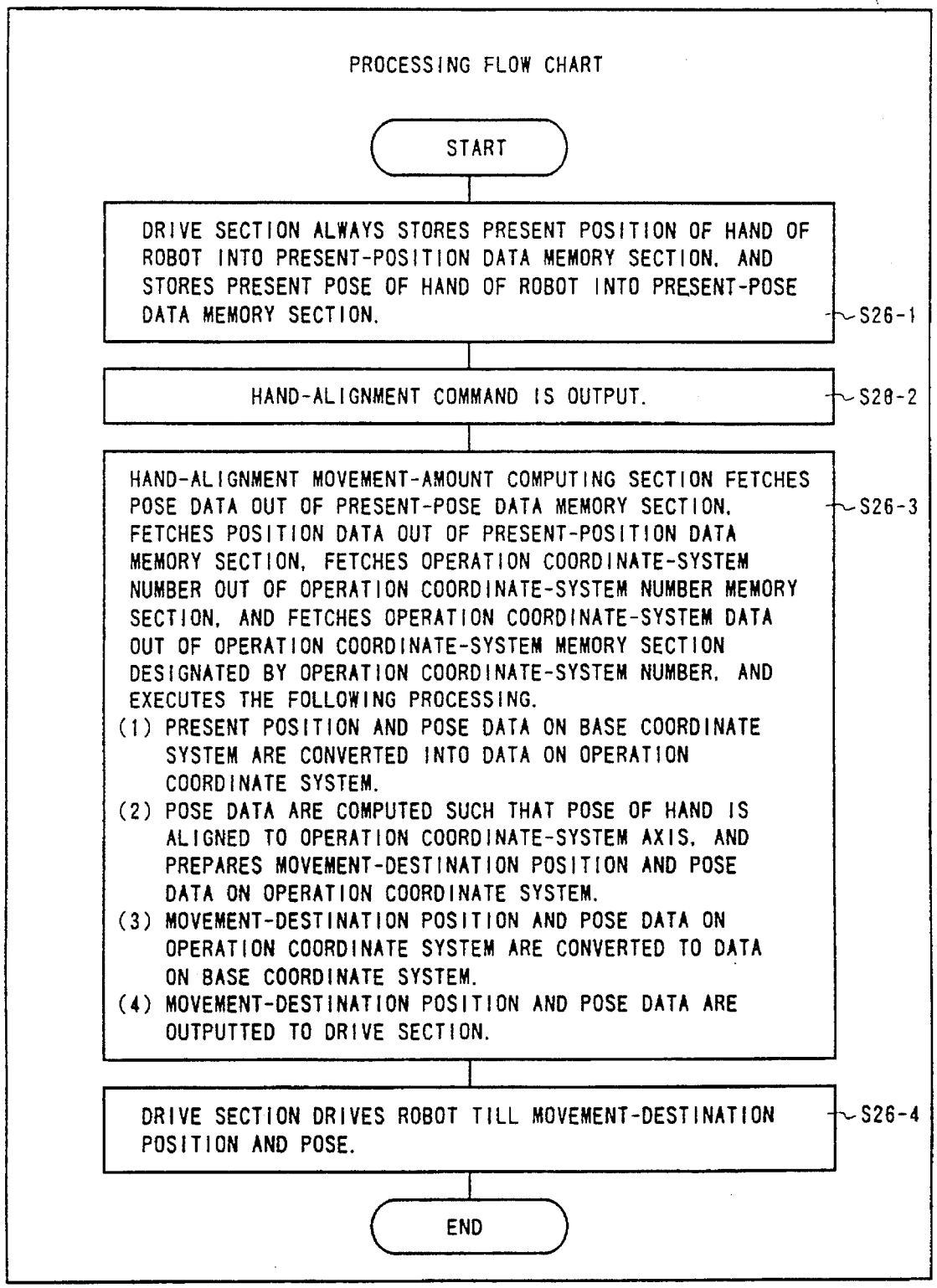
FIG. 26 is a flow chart, with the control system shown in FIG. 23 described from the viewpoint of the software, showing a flow of a program at hand alignment command.

FIGS. 24 through 26 describe FIG. 23 from the viewpoint of software. FIG. 24 illustrates a data structure, and FIG. 25 illustrates a flow (F25) of a program at working coordinate system number command, while FIG. 26 illustrates a flow (F26) of a program at hand alignment command.

Operation will next be described. In FIGS. 23 through 26, the drive section 5 always stores a current or present position (24-1) of the hand of the robot into the present-position data memory section 6, and stores the present pose (24-4) of the hand of the robot into the present-pose data memory section 7, as seen in step S26-1. Stored in the first working coordinate system memory section 22, the second working coordinate system memory section 23 and the nth working coordinate system memory section 24 are data (24-9)

respectively indicating the working coordinate systems on the base coordinate system.

When an operator instructs a specific working coordinate system by use of the working coordinate system number command section 25 of the teaching box 1, a working coordinate system command is output (step S25-1) and the working coordinate system number command section 25 stores data (24-7) indicating a number, corresponding to the specific working coordinate system, into the working coordinate system number memory section 26 (step S25-2).

Subsequently, the operator instructs the hand alignment operation by use of the teaching box 1. The hand-alignment command section 2 outputs the hand alignment command (24-5) to the hand-alignment movement-amount computing section 4 (step S26-2). Then in step S26-3, the hand-alignment movement-amount computing section 4 fetches the working coordinate system number out of the working coordinate system number memory section 26. The hand-alignment movement-amount computing section 4 fetches the working coordinate system data (24-9) out of the second working coordinate system memory section 23 designated by the number, fetches the position data (24-1) out of the present-position data memory section 6, and fetches the pose data (24-4) out of the present-pose data memory section 7. The hand-alignment movement-amount computing section 4 executes computation such that the pose of the hand is brought to parallel with or perpendicularity to each axis of X, Y and Z in the working coordinate system. The hand-alignment movement-amount computing section 4 prepares the movement-destination position and pose data (24-2), and outputs the same to the drive section 5.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

Present position and pose Msc expressed by the working coordinate system are first obtained by the coordinate transformation section from the base coordinate system to the working coordinate system, on the basis of the following equation:

$$Msc = (Ms)^{-1}, Mbc$$

Subsequently, the movement-destination position and pose expressed by the working coordinate system are computed from the present position and pose expressed by the working coordinate system, on the basis of the following equations:

$$Xsd = Xsc$$

$$Ysd = Ysc$$

$$Zsd = Zsc$$

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation section from the working coordinate system to the base coordinate system, on the basis of the following equation:

$$Mbd = Ms * Msd$$

Lastly, the drive section 5 drives the robot 8 to the movement-destination position and pose. In this connection, operation commanding the working coordinate system number can be omitted in cases other than the case where the working coordinate system number is switched, that is, in case where the working coordinate system number the same as the previous one is commanded.

An eighth embodiment of the invention will be described below with reference to FIGS. 27 through 29.

Figure 27:
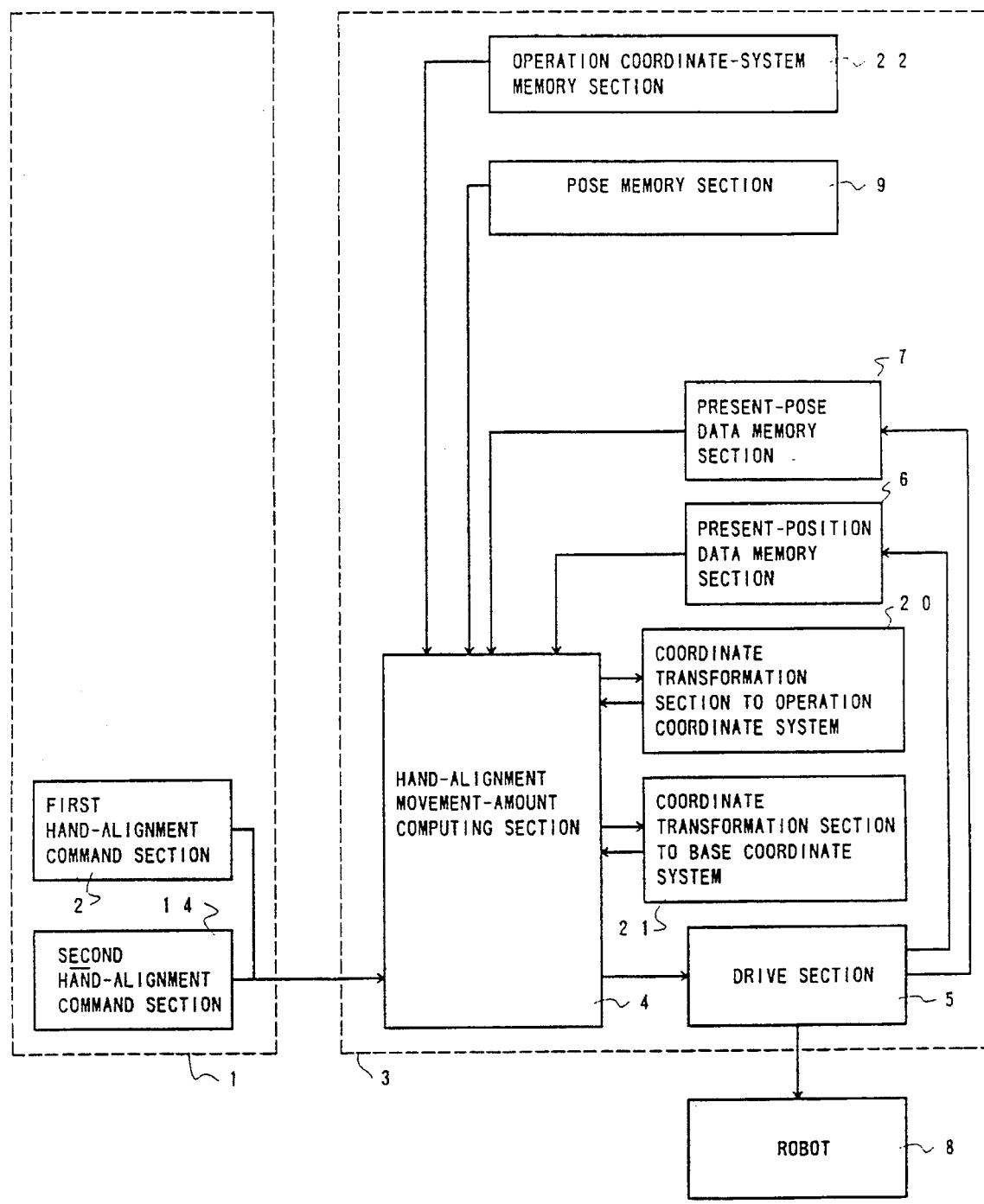
FIG. 27 is a block diagram showing an eighth embodiment according to the invention.

FIG. 27 is a block diagram showing a hand alignment operation according to the eighth embodiment. In FIG. 27, a teaching box 1 is provided with a hand alignment command section 2 which instructs hand alignment by which a stored optional pose is brought to a destination pose. The reference numeral 3 denotes a control unit for a robot. A hand-alignment movement-amount computing section 4 computes an amount of movement of each axis of the robot at the hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A pose memory section 9 is provided in which the pose data of the hand required for the operation teaching are stored. A second hand alignment command section 14 instructs hand alignment by which the pose aligned on the working coordinate system is brought to a destination pose. A coordinate transformation section 20 is provided from a base coordinate system to a working coordinate system. A coordinate transformation section 21 is provided from the working coordinate system to the base coordinate system. The reference numeral 22 denotes a working coordinate system memory section.

Figure 29:
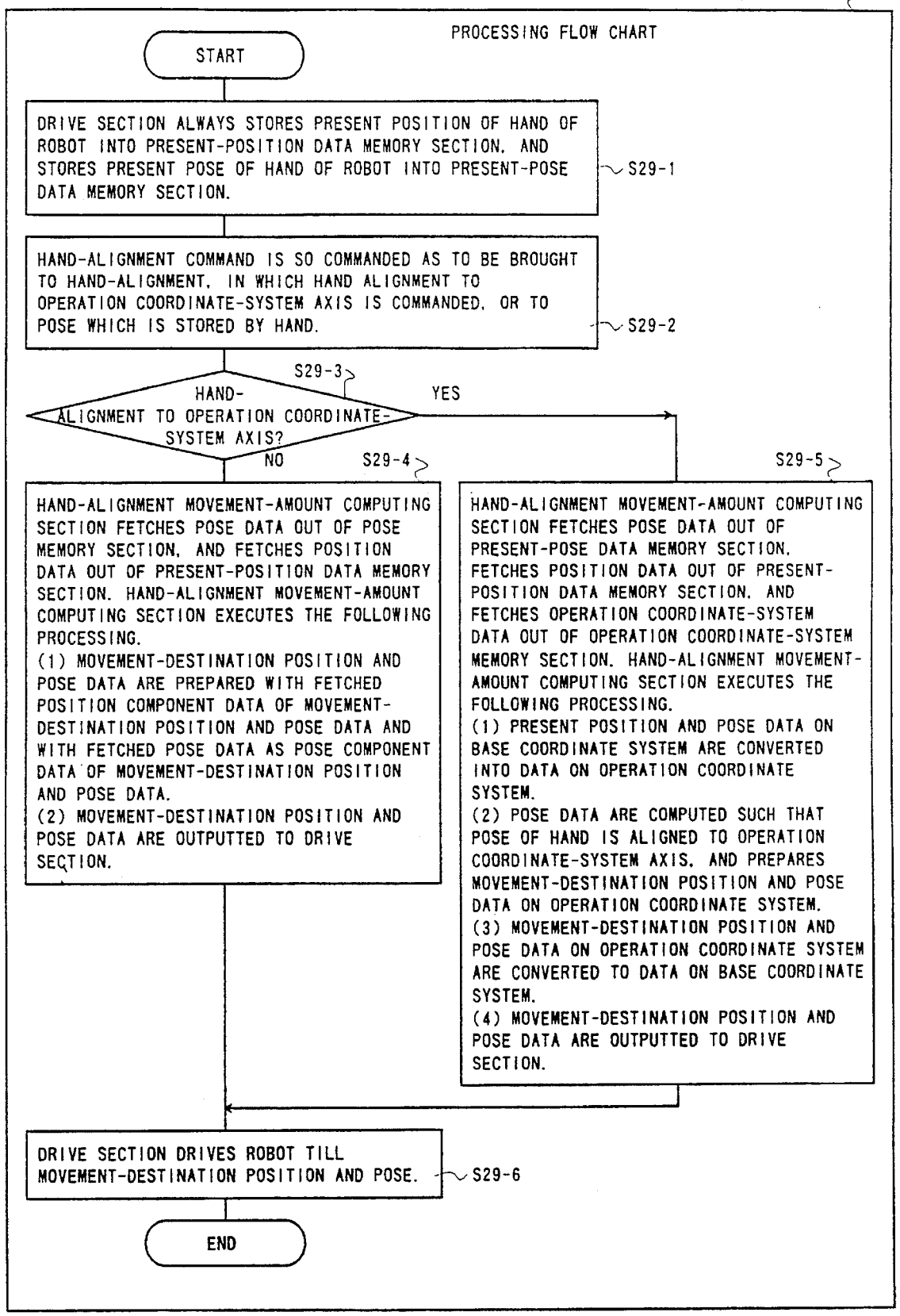
FIG. 29 is a flow chart, with the control system shown in FIG. 27 described from the viewpoint of the software, showing a flow of a program.

FIGS. 28 and 29 describe FIG. 27 from the viewpoint of software. FIG. 28 illustrates a data structure, and FIG. 29 illustrates a flow (F29) of a program.

Operation will next be described. In FIGS. 27 through 29, the drive section 5 always stores a current or present position (28-1) of the hand of the robot into the present-position data memory section 6, and stores the present pose (28-4) of the hand of the robot into the present-pose data memory section 7, as seen in step S29-1. Stored in the pose memory section 9 are pose data (28-3) of the hand required for the teaching operation. Further, stored in the working coordinate system memory section 22 are data (28-9) indicating the working coordinate system on the base coordinate system.

As seen in step S29-2 and S29-3, it is possible for the operator to optionally select the hand alignment operation by which the stored optional pose is brought to a destination pose, and hand alignment operation by which the pose aligned on the working coordinate system is brought to a destination pose.

Operation of a case will first be described where the operator instructs, by use of the teaching box 1, the hand alignment operation by which the stored optional pose is brought to a destination pose. In step S29-2, the hand alignment command section 2 outputs, to the hand-alignment movement-amount computing section 4, the hand alignment command (28-5) indicating the hand alignment operation by which the stored optional pose is brought to the destination pose.

In step S29-4, the hand-alignment movement-amount computing section 4 fetches the pose data (28-3) out of the pose memory section 9, and fetches the position data (28-1) out of the present-position data memory section 6. The hand-alignment movement-amount computation section 4 prepares the movement-destination position and pose data (28-2) with the fetched position data (28-1) as a movement destination position and with the fetched pose data (28-3) as a movement destination pose, and outputs the movement-destination position and pose data (28-2) to the drive section 5.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Lastly, the drive section 5 drives the robot 8 till the movement-destination position and pose.

Operation of a case will next be described where the operator instructs, by section of the teaching box 1, the hand alignment operation in which the pose aligned on the working coordinate system is brought to a destination pose. The hand-alignment command section 14 outputs, to the hand-alignment movement-amount computing section 4, the hand alignment command (28-5) indicating the hand alignment by which the pose aligned on the working coordinate system is brought to the destination pose, as seen in step S29-2. According to step S29-5, the hand-alignment movement-amount computing section 4 fetches the working coordinate system data (28-9) out of the working coordinate system memory section 22, fetches the position data (28-1) out of the present-position data memory section 6, and fetches the pose data (28-4) out of the present-pose data memory section 7. The hand-alignment movement-amount computing section 4 executes computation such that the pose of the hand is brought to parallel with or perpendicularity to each axis of X, Y and Z in the working coordinate system. The hand-alignment movement-amount computing section 4 prepares the movement-destination position and pose data (28-2), and outputs the same to the drive section 5.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

Present position and pose Msc expressed by the working coordinate system are first obtained by the coordinate transformation section from the base coordinate system to the working coordinate system, on the basis of the following equation:

$$Msc=(Ms)^{-1} * Mbc$$

Subsequently, the movement-destination position and pose expressed by the working coordinate system are computed from the present position and pose expressed by the working coordinate system, on the basis of the following equations:

$$Xsd=Xsc$$

$$Ysd=Ysc$$

$$Zsd=Zsc$$

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained from the coordinate transformation section from the working coordinate system to the base coordinate system, on the basis of the following equation:

$$Mbd=Ms * Msd$$

Lastly, the drive section 5 drives the robot 8 till the movement-destination position and pose, as specified in step S29-6.

A ninth embodiment of the invention will be described below with reference to FIGS. 30 through 33.

Figure 30:
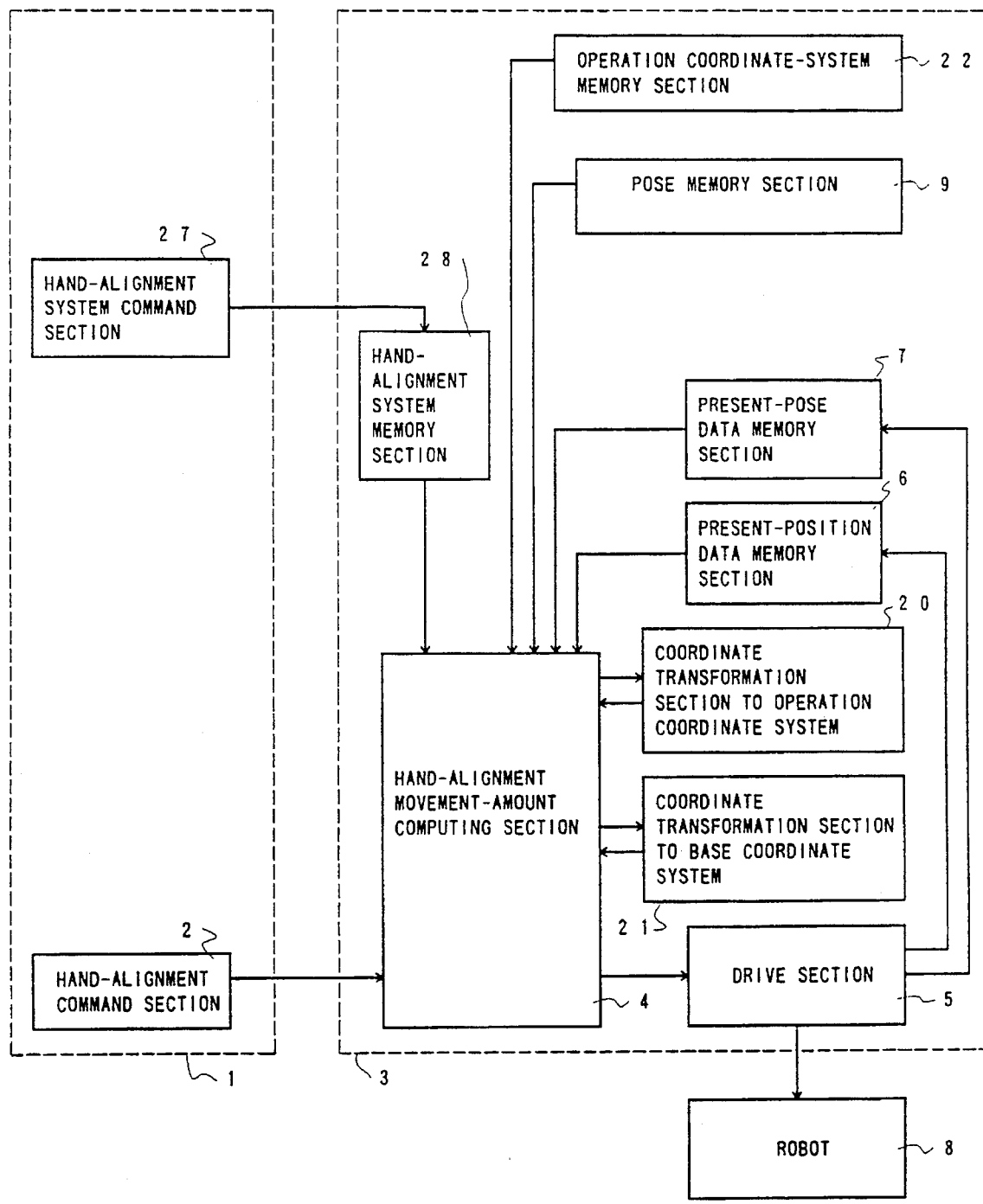
FIG. 30 is a block diagram showing a ninth embodiment according to the invention.

FIG. 30 is a block diagram showing hand alignment operation according to the ninth embodiment. In FIG. 30, a teaching box 1 is provided with a hand alignment command section 2. The reference numeral 3 denotes a control unit for a robot. A hand-alignment movement-amount computing section 4 computes an amount of movement of each axis of the robot at hand alignment operation. A drive section 5 commands operation directly to a robot body 8. A current-position or present-position data memory section 6 stores therein a present position of a hand of the robot, which is resulted from driving of the robot. A present-pose data memory section 7 stores therein a present pose of the hand of the robot, which is resulted from driving of the robot. A pose memory section 9 is provided in which the pose data of the hand required for the operation teaching are stored. A coordinate transformation section 20 is provided from a base coordinate system to a working coordinate system. A coordinate transformation section 21 is provided from the working coordinate system to the base coordinate system. The reference numeral 22 denotes a working coordinate system memory section. A hand-alignment system command section 27 instructs a hand alignment system in which the stored optional pose is brought to a destination pose, or a hand alignment system in which the pose aligned on the working coordinate system is brought to a destination pose. A hand alignment-system memory section 28 is provided in which the data distinguishing the hand alignment systems from each other are stored.

Figure 31:
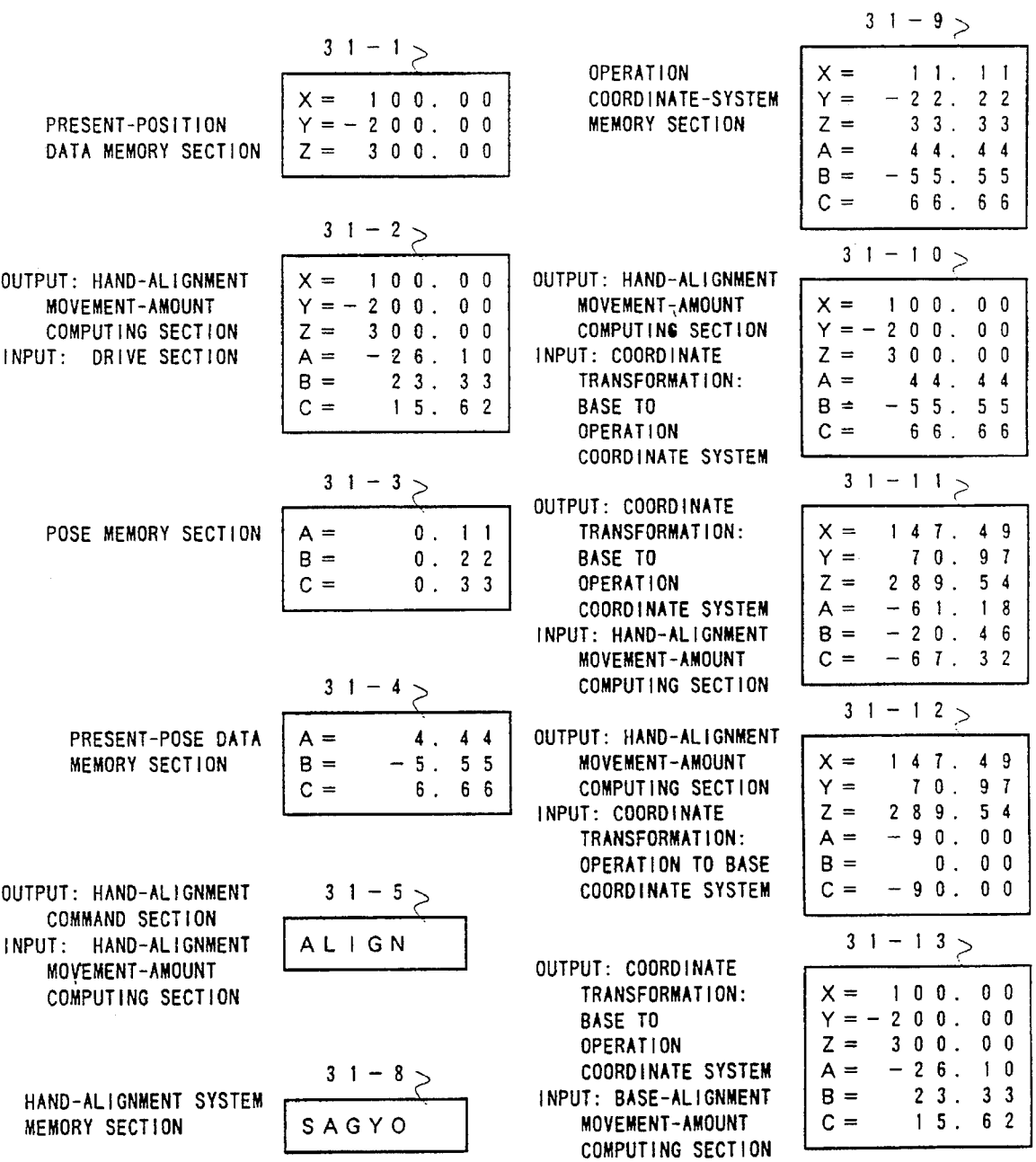
FIG. 31 is a view for explanation, with a control system shown in FIG. 30 described from the viewpoint of a software, showing a data structure.
Figure 32:
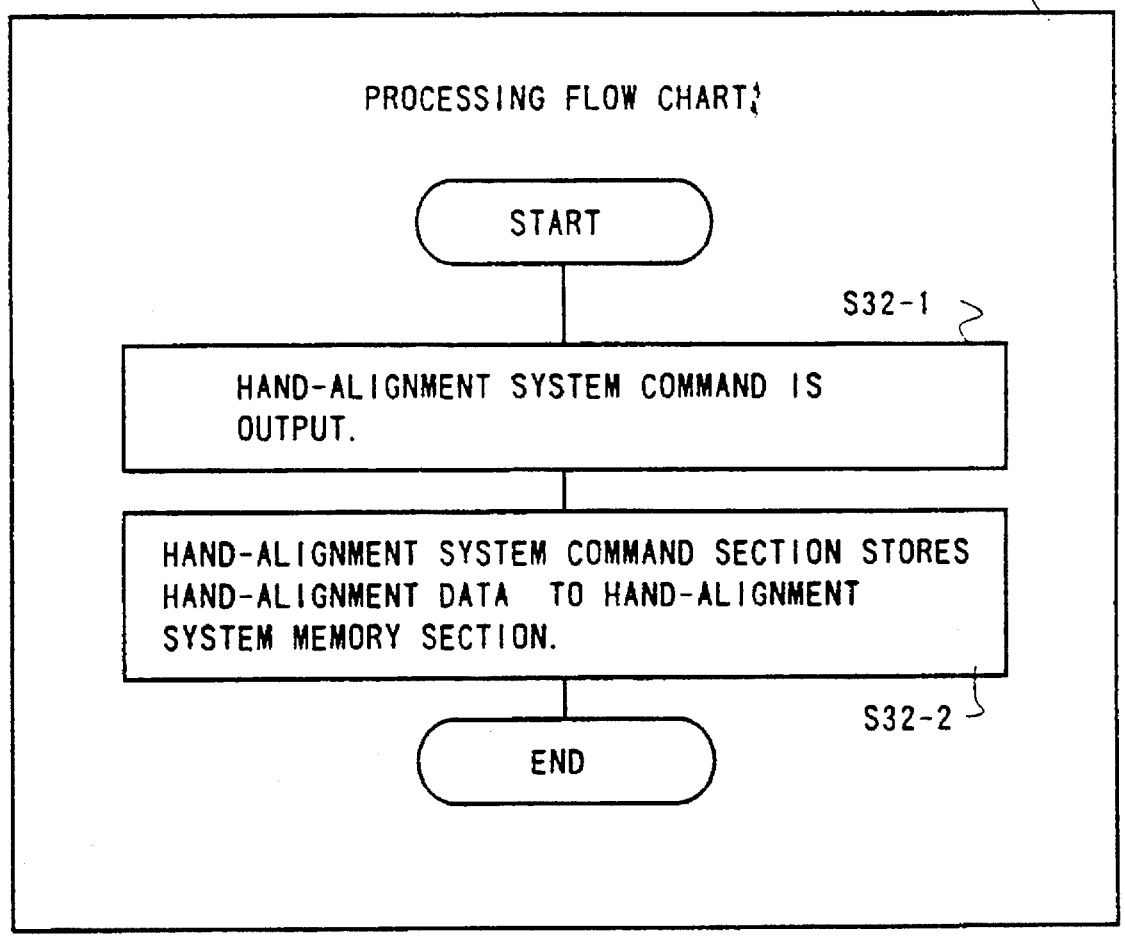
FIG. 32 is a flow chart, with the control system shown in FIG. 30 described from the viewpoint of the software, showing a flow of a program at hand alignment-system command.
Figure 33:
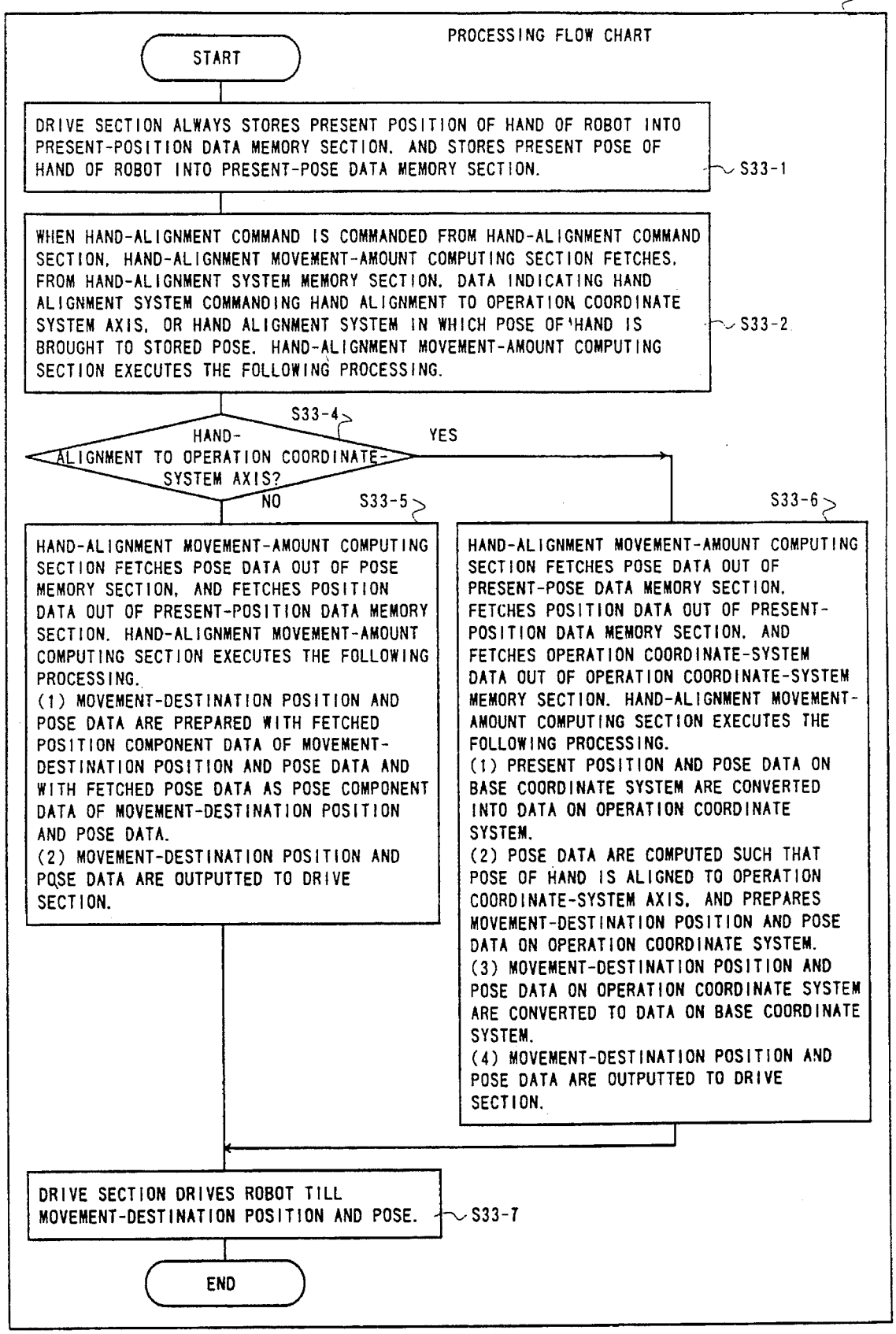
FIG. 33 is a flow chart, with the control system shown in FIG. 30 described from the viewpoint of the software, showing a flow of a program at hand alignment command.
Figure 34:
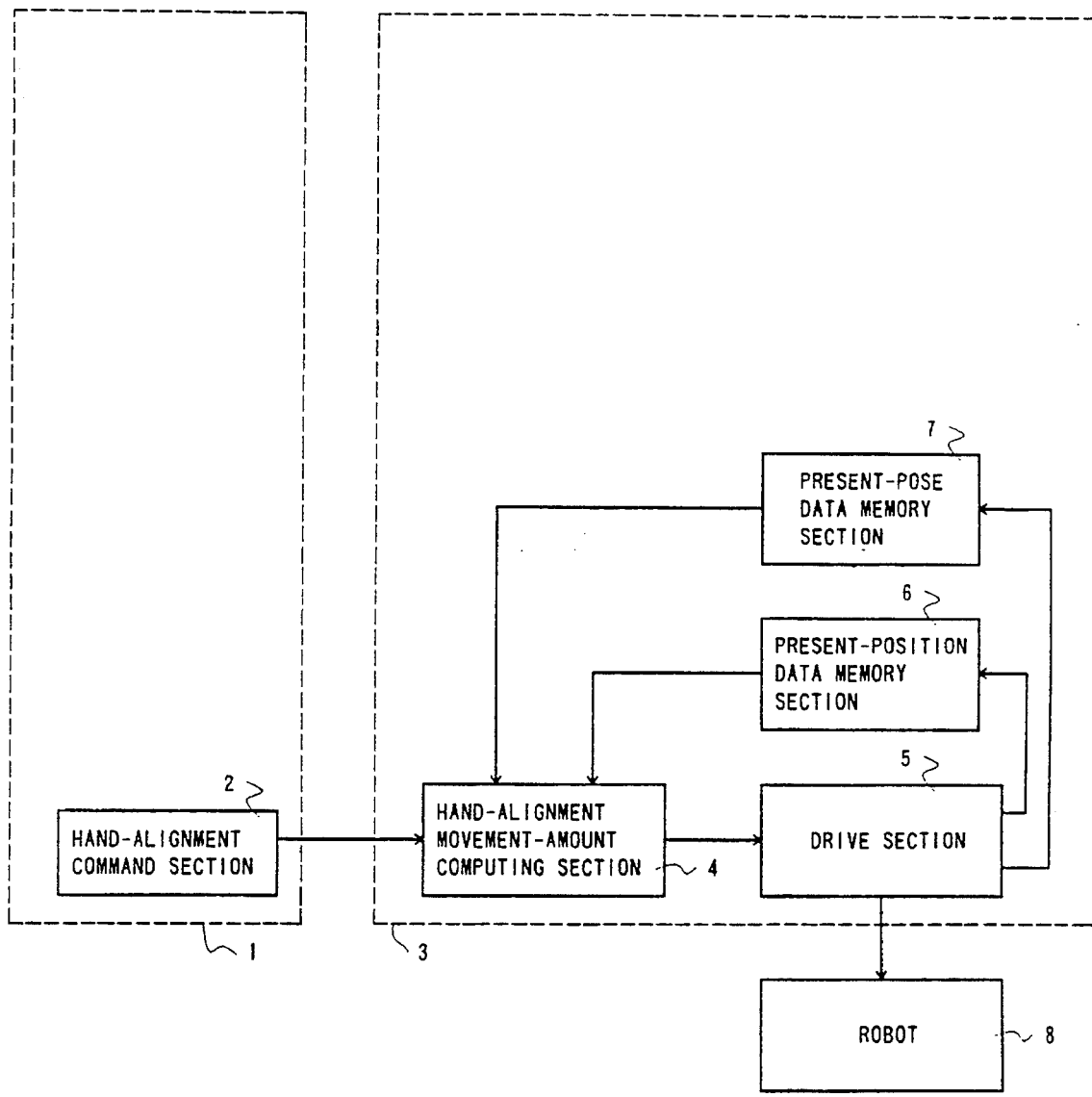
FIG. 34 is a block diagram showing a conventional technique.

FIGS. 31 through 33 describe FIG. 30 from the viewpoint of software. FIG. 31 illustrates a data structure, and FIG. 32 illustrates a flow (F32) of a program at the hand alignment-system command, while FIG. 33 illustrates a flow (F33) of a program at the hand alignment command.

Operation will next be described. In FIGS. 30 through 33, the drive section 5 always stores a current or present position (31-1) of the hand of the robot into the present-position data memory section 6, and stores the present pose (31-4) of the hand of the robot into the present-pose data memory section 7, as seen in step S33-1. Stored in the pose memory section 9 are pose data (31-3) of the hand required for the teaching operation. Further, stored in the working coordinate system memory section 22 are data (31-9) indicating the working coordinate system on the base coordinate system. Moreover, it is possible for the operator to optionally select the hand alignment operation by which the stored optional pose is brought to a destination pose, and hand alignment operation by which the pose aligned on the working coordinate system is brought to a destination pose.

Operation will first be described at the time the hand alignment operation by which the stored optional pose is brought to the destination pose is selected. When the operator instructs the hand alignment system in which the stored optional pose is brought to the destination pose, by the hand alignment-system command section 27 of the teaching box 1, a hand alignment system command is output, as seen in step S32-1. In response to the command, as seen in step S32-2, the hand alignment-system command section 27 stores the data (31-8) indicating the hand alignment system, into the hand alignment-system memory section 28.

Subsequently, the operator instructs the hand alignment operation by use of the teaching box 1. The hand alignment command section 2 outputs the hand alignment command (31-5) to the hand-alignment movement-amount computing section 4. As seen in step S33-2, the hand-alignment movement-amount computing section 4 fetches the data (31-8) distinguishing the hand alignment systems from each other, out of the hand alignment-system memory section 28, and judges that the fetched data are the hand alignment system in which the stored optional pose is brought to the destination pose. The hand-alignment movement-amount computing section 4 practices the following processing in accordance with step S33-5. That is, the hand-alignment movement-amount computing section 4 fetches the pose data (31-3) out of the pose memory section 9, and fetches the position data (31-1) out of the present-position data memory section 6. The hand-alignment movement-amount computing section 4 prepares the movement-destination position and pose data (31-2) with the fetched position data (31-1) as the movement destination position and with the fetched pose data (31-3) as the movement-destination pose, and outputs the same to the drive section 5.

That is, assuming that a present position is (Xc, Yc, Zc), a stored pose is (Am, Bm Cm), and movement-destination position and pose due to the computing results are (X, Y, Z, A, B, C), the following relations are produced:

X=Xc
Y=Yc
Z=Zc
A=Am
B=Bm
C=Cm

Lastly, in step S33-7, the drive section 5 drives the robot 8 till the movement-destination position and pose.

Operation will next be described at the time the hand alignment operation is selected in which the pose aligned on the working coordinate system is brought to the destination pose. When the operator instructs the hand alignment system in which the pose aligned on the working coordinate system is brought to the destination pose, by the hand alignment-system command section 27 of the teaching box 1, the hand alignment-system command section 27 stores the data (31-8) indicating the hand alignment system, into the hand alignment-system memory section 28. This is detected at decision step S33-4.

When the operator instructs the hand alignment operation by section of the teaching box 1, the hand alignment command section 2 outputs the hand alignment command (31-5) to the hand-alignment movement-amount computing section 4. As seen in step S33-6, the hand-alignment movement-amount computing section 4 fetches the data (31-8) distinguishing the hand alignment systems from each other, out of the hand alignment-system memory section 28, and judges that the fetched data are the hand alignment system in which the pose aligned on the working coordinate system is brought to the destination pose. The hand-alignment movement-amount computing section 4 executes the following processing.

The hand alignment command section (14) outputs, to the hand-alignment movement-amount computing section 4, the hand alignment command (31-5) indicating the hand alignment in which the pose aligned on the working coordinate system is brought to the destination pose. The hand-alignment movement-amount computing section 4 fetches the working coordinate system data (31-9) out of the working coordinate system memory section 22, fetches the position data (31-1) out of the present-position data memory section 6, and fetches the pose data (31-4) out of the present-pose data memory section 7. The hand-alignment movement-amount computing section 4 executes computation such that the pose of the hand is brought to parallel with or perpendicularity to each axis of X, Y and Z in the working coordinate system. The hand-alignment movement-amount computing section 4 prepares the movement-destination position and pose data (31-2), and outputs the same to the drive section 5.

A computing method of the above will be described below. Generally, a position can be expressed by a matrix having three rows and one column, and a pose can be expressed by a rotating matrix having three rows and three columns, while position and pose can be expressed by a matrix having four rows and four columns. Here, it is assumed that the present position and pose expressed by the base coordinate system are (Xbc, Ybc, Zbc, Abc, Bbc, Cbc), the movement-destination position and pose expressed by the base coordinate system are (Xbd, Ybd, Zbd, Abd, Bbd, Cbd), the present position and pose expressed by the working coordinate system are (Xsc, Ysc, Zsc, Asc, Bsc, Csc), the movement-destination position and pose expressed by the working coordinate system are (Xsd, Ysd, Zsd, Asd, Bsd, Csd), the data indicating the working coordinate system on the base coordinate system are (Xs, Ys, Zs, As, Bs, Cs), the above elements expressed respectively by matrixes are Mbc, Mbd, Msc, Msd and Ms in order, ¥ is an operator expressing an integer division, * is an operator indicating a product of the matrix, and a matrix $(M)^{-1}$ indicates an inverse matrix of a matrix $\underline{M}$.

Present position and pose expressed by the working coordinate system are first obtained by the coordinate transformation section from the base coordinate system to the working coordinate system, on the basis of the following equation:

$$Msc = (Ms)^{-1} * Mbc$$

Subsequently, the movement-destination position and pose expressed by the working coordinate system are computed from the present position and pose expressed by the working coordinate system, on the basis of the following equations:

$$Xsd = Xsc$$

$$Ysd = Ysc$$

$$Zsd = Zsc$$

In case of Asc≧0: Asd=90°×((Asc+45°)¥90°)

In case of Asc<0: Asd=90°×((Asc−45°)¥90°)

In case of Bsc≧0: Bsd=90°×((Bsc+45°)¥90°)

In case of Bsc<0: Bsd=90°×((Bsc−45°)¥90°)

In case of Csc≧0: Csd=90°×((Csc+45°)¥90°)

In case of Csc<0: Csd=90°×((Csc−45°)¥90°)

Subsequently, the movement-destination position and pose Mbd expressed by the base coordinate system are obtained by the coordinate transformation section from the working coordinate system to the base coordinate system, on the basis of the following equation:

$$Mbd = Ms * Msd$$

Lastly, the drive section 5 drives the robot 8 to the movement-destination position and pose, as seen in step S33-7.

In connection with the above, the operation commanding the hand alignment system can be omitted in cases other than the case where the hand alignment system is switched, that is, in the case where the hand alignment system the same as the previous one is commanded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control system for a robot having a hand and a hand alignment function for automatically adjusting a present position and pose of the hand to a desired position and pose without first moving the hand of the robot, said control system comprising:

a drive means for driving said hand;

a present-position data memory means for storing data corresponding to the present position of the hand;

a present-pose data memory means for storing data corresponding to the present pose of the hand;

a pose memory means for storing data corresponding to the desired pose;

a pose data modifying means for modifying a format of the data stored in said pose memory means to coincide with a format of the data stored in said present-pose data memory means;

a pose memory command means for instructing said pose data modifying means to modify the format of the data stored in said pose memory means to coincide with the format of the data stored in said present-pose data memory means; and a hand-alignment movement-amount computing means for computing data corresponding to the desired position and pose, and for outputting the computed data corresponding to the desired position and pose to said drive means.

2. A control system for a robot having a hand and a hand alignment function for automatically adjusting a present position and pose of the hand to a desired position and pose without first moving the hand of the robot, said control system comprising:

a drive means for driving said hand;

a present-position data memory means for storing data corresponding to the present position of the hand;

a present-pose data memory means for storing data corresponding to the present pose of the hand;

a pose memory means for storing data corresponding to the desired pose;

a pose data modifying means for modifying a format of the data stored in said pose memory means to coincide with a format of the data stored in said present-pose data memory means;

a pose memory command means for instructing modification of said data stored in said pose memory means by said pose data modifying means;

a hand-alignment movement-amount computing means, responsive to said pose data modifying means, for computing an amount of movement of the hand from the present position and pose to the desired position and pose, and for outputting the computed amount of movement to said drive means; and a hand alignment command means for instructing said hand-alignment movement-amount computing means to compute the amount of movement of the hand and to output the computed amount of movement to said drive means.

3. A control system for a robot having a hand and a hand alignment function for automatically adjusting a present position and pose of the hand to a desired position and pose without first moving the hand of the robot, said control system comprising:

a drive means for driving said hand;

a present-position data memory means for storing data corresponding to the present position of the hand;

a present-pose data memory means for storing data corresponding to the present pose of the hand;

a plurality of pose memory means for storing data corresponding to a plurality of desired poses;

a pose identifier number memory means for storing data indicating which of said plurality of pose memory means contains data corresponding to a desired pose;

a pose identifier number command means for instructing said pose identifier number memory means to select desired pose data from said plurality of pose memory means;

a pose data modifying means for modifying a format of the data stored in a selected one of said plurality of pose memory means to coincide with a format of the data stored in the present-pose data memory means;

a pose memory command means for instructing said pose data modifying means to modify the format of the data stored in the selected one of said plurality of pose memory means;

a hand-alignment movement-amount computing means, responsive to said pose data modifying means, for computing an amount of movement of the hand from the present position and pose to the desired position and pose, and for outputting the computed amount of movement to said drive means; and a hand alignment command means for instructing said hand-alignment movement-amount computing means to compute the amount of movement and to output the computed amount of movement to said drive means.

4. A control system for a robot having a hand and a hand alignment function for automatically adjusting a present position and pose of the hand to one of a desired position and pose and an optional position and pose without first moving the hand of the robot, said control system comprising:

a drive means for driving said hand;

a present-position data memory means for storing data corresponding to the present position of the hand;

a present-pose data memory means for storing data corresponding to the present pose of the hand;

a pose memory means for storing data corresponding to the desired pose and the optional pose;

a working coordinate system memory means for storing data in a working coordinate system format;

a coordinate transformation means for transforming data stored in said pose memory means and said present-pose data memory means from a base coordinate system format to a working coordinate system format, the transformed data being stored in said working coordinate system memory means;

a coordinate transformation means for transforming data stored in said pose memory means and said present-pose data memory means from the working coordinate system format to the base coordinate system format;

a hand-alignment movement-amount computing means for determining whether the data transformed from said present-pose data memory means is the same as the data transformed from said pose memory means, for computing an amount of movement of the hand from the present position and pose to one of the desired position and pose and the optional position and pose, and for outputting the computed amount of movement of the hand to said drive means; and a hand alignment command means for instructing the hand-alignment movement-amount computing means to compare the data transformed from the present-pose data memory means and the pose memory means, to compute the amount of movement of the hand, and to output the computed amount of movement.

5. A control system for a robot having a hand and a hand alignment function for automatically adjusting a present position and pose of the hand to one of a desired position and pose and an optional position and pose without first moving the hand of the robot, said control system comprising:

a drive means for driving said hand;

a present-position data memory means for storing data corresponding to the present position of the hand;

a present-pose data memory means for storing data corresponding to the present pose of the hand;

a pose memory means for storing data corresponding to the desired pose and the optional pose;

a working coordinate system memory means for storing data in a working coordinate system format;

a coordinate transformation means for transforming data stored in said pose memory means and said present-pose data memory means from a base coordinate system format to the working coordinate system format, the transformed data being stored in said working coordinate system memory means;

a coordinate transformation means for transforming data stored in the working coordinate system format to the base coordinate system format;

a hand-alignment system memory means for storing data indicating whether the present pose in the working coordinate system is the same as the desired pose and for storing data indicating whether the optional pose in the working coordinate system is the same as the desired pose;

a hand-alignment system command means for instructing said hand-alignment system memory means to store data indicating whether the present pose and the optional pose are the same as the desired pose;

a hand-alignment movement-amount computing means for determining whether the present pose in the working coordinate system is the same as the desired pose, for determining whether the optional pose in the working coordinate system is the same as the desired pose, for computing an amount of movement of the hand to the desired position and pose, and for outputting the computed amount of movement to said drive means; and a hand alignment command means for instructing said hand-alignment movement-amount computing means to determine whether the present pose and the optional pose are the same as the desired pose, to compute the amount of movement of the hand, and to output the computed amount of movement to said drive means.

6. A method of controlling a robot having a hand, said hand being moveable automatically to a desired pose and position without first moving the robot hand, said method comprising the steps of:

storing in a present memory means a first set of data representing a present position of the robot hand and a second set of data representing a present pose of the robot hand;

retrieving said second set of data from the present memory means and storing said second set of data as a third set of data in a pose memory means;

retrieving said first set of data from the present memory means in response to a command;

calculating data representing the desired position and pose from said first set of data and said third set of data;

outputting the calculated data corresponding to the desired position and pose; and driving the robot hand in response to the data output in said outputting step.

7. A method of controlling a robot having a hand, as set forth in claim 6, further comprising the steps of:

creating a plurality of pose memory sections, each of said plurality of pose memory sections being operative to store the third data set for a corresponding one of a plurality of poses; and in response to the specification of a particular one of said plurality of poses, storing said second data set in a corresponding one of said plurality of pose memory sections.

8. A method of controlling a robot having a hand, as set forth in claim 7, further comprising the steps of:

in response to a hand alignment command, identifying a desired pose; and retrieving said third data set from a corresponding one of said plurality of pose memory sections, wherein said calculating step is performed using said third data set from a corresponding one of said plurality of pose memory sections.

9. A method of controlling a robot having a hand, as set forth in claim 8, further comprising the step of:

specifying each of said plurality of poses by a unique identifier, wherein said identifying and retrieving steps are conducted on the basis of said identifier.

10. A method of controlling a robot having a hand, said hand being moveable automatically to a predetermined pose without first moving the robot hand, said method comprising the steps of:

storing in memory a first data set representing a present position of the hand and a second data set representing a present pose of the hand, wherein both data sets are in a base coordinate system;

storing a third data set corresponding to an operation coordinate system;

storing a fourth data set representing one of a desired and optional pose;

retrieving data from at least one of said third and fourth data sets in response to a hand alignment command;

determining whether or not a present pose is aligned on the operation coordinate system;

in response to a determination that the present pose is aligned on the operation coordinate system, retrieving data from said first and second data sets and executing the following steps:

calculating a first set of desired position and pose data using the data from said first and second data sets;

outputting the first set of desired position and pose data; and driving the robot hand in response to the first set of desired position and pose data; and in response to a determination that the present pose is not aligned on the operation coordinate system, retrieving data from said first data set, said second data set and said third data set, and executing the following processing steps:

converting said first data set and second data set on the base coordinate system into a fifth data set on the operation coordinate system;

calculating a second set of desired position and pose data on said operation coordinate system from the fifth data set;

converting the second set of desired position and pose data in the operation coordinate system to a third set of desired position and pose data in the base coordinate system;

outputting the third set of desired position and pose data; and driving the robot hand in response to the third set of desired position and pose data.

* * * * *